United States Patent
Mellor et al.

(10) Patent No.: US 12,022,580 B2
(45) Date of Patent: Jun. 25, 2024

(54) LAMINATED GLASS

(71) Applicants: PILKINGTON GROUP LIMITED, Nr. Ormskirk (GB); NIPPON SHEET GLASS COMPANY, LIMITED, Tokyo (JP)

(72) Inventors: Leigh Mellor, Nr. Ormskirk (GB); Mark A. Chamberlain, Nr. Ormskirk (GB); Graham Siddons, Nr. Ormskirk (GB); Ryohei Ogawa, Tokyo (JP); Kazuki Chiba, Tokyo (JP); Hisashi Ogawa, Tokyo (JP); Kentaro Yamada, Tokyo (JP); Takumitsu Sakamoto, Tokyo (JP)

(73) Assignees: PILKINGTON GROUP LIMITED, Lathom (GB); NIPPON SHEET GLASS COMPANY, LIMITED, Tokyo (JP)

( * ) Notice: Subject to any disclaimer, the term of this patent is extended or adjusted under 35 U.S.C. 154(b) by 1179 days.

(21) Appl. No.: 16/609,997

(22) PCT Filed: May 1, 2018

(86) PCT No.: PCT/JP2018/017469
§ 371 (c)(1),
(2) Date: Dec. 19, 2019

(87) PCT Pub. No.: WO2018/203563
PCT Pub. Date: Nov. 8, 2018

(65) Prior Publication Data
US 2022/0418050 A1    Dec. 29, 2022

(30) Foreign Application Priority Data

May 2, 2017 (JP) .................................. 2017-092002
Jul. 14, 2017 (JP) .................................. 2017-138638

(51) Int. Cl.
*H05B 3/86* (2006.01)
*B32B 17/10* (2006.01)
(Continued)

(52) U.S. Cl.
CPC ......... *H05B 3/86* (2013.01); *B32B 17/10036* (2013.01); *B32B 17/10385* (2013.01);
(Continued)

(58) Field of Classification Search
CPC ........ H05B 2203/002; H05B 2203/011; H05B 3/86; H05B 2203/016; B32B 17/10036;
(Continued)

(56) References Cited

U.S. PATENT DOCUMENTS 5,798,499 A * 8/1998 Shibata .................... H05B 3/84
                                                        52/171.2
2012/0152930 A1* 6/2012 Chamberlain ........... H05B 3/86
                                                        219/203

(Continued)

FOREIGN PATENT DOCUMENTS

CN      102484900 A      5/2012
EP      3 572 386 A1    11/2019
(Continued)

OTHER PUBLICATIONS

Chinese Office Action for Chinese Application No. 201880029115.X, dated Apr. 18, 2022, with English translation.
(Continued)

*Primary Examiner* — Phuong T Nguyen
(74) *Attorney, Agent, or Firm* — Birch, Stewart, Kolasch & Birch, LLP

(57) ABSTRACT

Laminated glass includes: an outer glass plate having a first side and a second side; an inner glass plate that is arranged opposing the outer glass plate and has substantially the same shape as a shape of the outer glass plate; and an intermediate
(Continued)

layer arranged between the outer and the inner glass, wherein the intermediate layer has a heat-generating layer including: a first bus bar that extends along an end portion closer to the first side; a second bus bar that extends along an end portion closer to the second side; and a plurality of heating lines arranged so as to connect the first bus bar and the second bus bar to each other, and when a predetermined voltage is applied between the first and second bus bars, an amount of heat generated per unit length of each of the heating lines is 2.0 W/m or less.

17 Claims, 21 Drawing Sheets

(51) Int. Cl.
| | | |
|---|---|---|
| B32B 7/12 | (2006.01) | |
| B32B 27/08 | (2006.01) | |
| B32B 27/30 | (2006.01) | |
| B32B 27/32 | (2006.01) | |
| B32B 27/34 | (2006.01) | |
| B32B 27/36 | (2006.01) | |
| B60J 1/00 | (2006.01) | |
| B60S 1/02 | (2006.01) | |

(52) U.S. Cl.
CPC ............... *B32B 7/12* (2013.01); *B32B 27/08* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 2250/40* (2013.01); *B32B 2605/00* (2013.01); *B60J 1/002* (2013.01); *B60S 1/026* (2013.01); *H05B 2203/002* (2013.01); *H05B 2203/011* (2013.01); *H05B 2203/016* (2013.01)

(58) Field of Classification Search
CPC ..... B32B 17/10385; B32B 7/12; B32B 27/08; B32B 27/302; B32B 27/304; B32B 27/306; B32B 27/308; B32B 27/32; B32B 27/34; B32B 27/36; B32B 27/365; B32B 2250/40; B32B 2605/00; B60J 1/002; B60S 1/026
USPC .................................................. 219/203, 522
See application file for complete search history.

(56) References Cited

U.S. PATENT DOCUMENTS

2016/0311402 A1* 10/2016 Suetsugu ................ B60S 1/026
2019/0389429 A1    12/2019 Chiba et al.

FOREIGN PATENT DOCUMENTS

| EP | 3 718 983 A1 | 10/2020 |
|---|---|---|
| JP | 8-72674 A | 3/1996 |
| JP | 2016-102056 A | 6/2016 |
| JP | 2016-143450 A | 8/2016 |
| WO | WO 2019/107458 A1 | 6/2019 |

OTHER PUBLICATIONS

Japanese Office Action for Japanese Application No. 2019-515743, dated Nov. 30, 2021, with English translation.
International Search Report issued in PCT/JP2018/017469 (PCT/ISA/210), dated Jul. 17, 2018.
Written Opinion of the International Searching Authority issued in PCT/JP2018/017469 (PCT/ISA/237), dated Jul. 17, 2018.
Chinese Office Action and Search Report for Chinese Application No. 201880029115.X, dated Jul. 21, 2021, with English translation.
Extended European Search Report for European Application No. 18795271.8, dated Jan. 11, 2021.

* cited by examiner

LAMINATED GLASS

TECHNICAL FIELD

The present invention relates to laminated glass.

BACKGROUND ART

A windshield of an automobile may fog on a cold day or in a cold climate area, and this fogging may cause trouble when driving. To address this, a variety of methods of defogging the windshield have been proposed. For example, Patent Document 1 discloses bus bars and heating lines arranged inside a windshield to defog the windshield using heat generated by the heating lines. In addition to automobiles, windows of various vehicles or forms of transportation conveyances, such as those of trains, may also fog, and similar bus bars and heating lines can be arranged.

CITATION LIST

Patent Literature

Patent Literature 1: JP 2016-143450A

SUMMARY OF INVENTION

Technical Problem

The inventors of the present application found the following problem regarding the aforementioned laminated glass. That is to say, the inventors found that, when a current is applied to the heating lines to heat the laminated glass, if the outside of the vehicle is viewed through the laminated glass, flicker occurs on an object outside the vehicle. As a result of examining the cause of this flicker, the inventors found that a resin layer around the heating lines is distorted by heat from the heating lines, and the refractive index of an intermediate layer changes due to this distortion. It was also understood that flicker occurs due to this change in the refractive index.

The present invention has been made to solve the foregoing problem, and aims to provide laminated glass with which flicker occurring when an object outside a vehicle is viewed can be prevented by heat from heating lines.

Solution to Problem

Item 1. Laminated glass including:
an outer glass plate having a first side and a second side opposing the first side;
an inner glass plate that is arranged opposing the outer glass plate and has substantially the same shape as a shape of the outer glass plate; and
an intermediate layer arranged between the outer glass plate and the inner glass plate,
wherein the intermediate layer has a heat-generating layer including:
a first bus bar that at least partially extends along an end portion closer to the first side;
a second bus bar that at least partially extends along an end portion closer to the second side; and
a plurality of heating lines arranged so as to connect the first bus bar and the second bus bar to each other, and
when a predetermined voltage is applied between the first and second bus bars, an amount of heat generated per unit length of each of the heating lines is 2.0 W/m or less.

Item 2. The laminated glass according to item 1, wherein the predetermined voltage is 400 V or less.

Item 3. The laminated glass according to item 1, wherein the predetermined voltage is 50 V or less.

Item 4. The laminated glass according to item 1, wherein the predetermined voltage is 13.5 V.

Item 5. The laminated glass according to any one of items 1 to 4, wherein the amount of heat generated per unit length of each of the heating lines is 1.5 W/m or more and 2.0 W/m or less.

Item 6. The laminated glass according to any one of items 1 to 4, wherein the amount of heat generated per unit length of each of the heating lines is 1.35 W/m or more and 1.5 W/m or less.

Item 7. The laminated glass according to any one of items 1 to 4, wherein the amount of heat generated per unit length of each of the heating lines is 1.20 W/m or more and 1.35 W/m or less.

Item 8. The laminated glass according to any one of items 1 to 4, wherein the amount of heat generated per unit length of each of the heating lines is 1.0 W/m or more and 1.20 W/m or less.

Item 9. The laminated glass according to any one of items 1 to 4, wherein the amount of heat generated per unit length of each of the heating lines is 0.8 W/m or more and 1.0 W/m or less.

Item 10. The laminated glass according to any one of items 1 to 4, wherein the amount of heat generated per unit length of each of the heating lines is 0.5 W/m or more and 0.8 W/m or less.

Item 11. The laminated glass according to any one of items 1 to 10, wherein the heating lines are not in contact with any of the outer glass plate and the inner glass plate.

Item 12. The laminated glass according to any one of items 1 to 11, wherein the largest value of an amount of heat generated per unit area of the intermediate layer when the voltage is applied is 400 W/m$^2$ or more, the plurality of heating lines are arranged in parallel, and a distance between adjacent ones of the heating lines is 0.5 to 4.0 mm.

Item 13. The laminated glass according to item 12, wherein the distance between adjacent ones of the heating lines is 0.5 to 3.5 mm.

Item 14. The laminated glass according to item 12, wherein the distance between adjacent ones of the heating lines is 0.5 to 3.0 mm.

Item 15. The laminated glass according to item 12, wherein the distance between adjacent ones of the heating lines is 1.25 to 3.0 mm.

Item 16. The laminated glass according to any one of items 1 to 15, wherein resistance of each of the heating lines is 30Ω or more.

Item 17. The laminated glass according to item 16, wherein the resistance of each of the heating lines is 90Ω or more.

Item 18. The laminated glass according to item 16, wherein a cross-sectional area of each of the heating lines is 200 μm$^2$ or less.

Item 19. The laminated glass according to item 18,
wherein a line width of each of the heating lines is 22 μm or less.

Item 20. The laminated glass according to item 16,
wherein a length of each of the heating lines between the two bus bars is greater than or equal to a distance between the first bus bar and the second bus bar.

Item 21. The laminated glass according to item 20,
wherein at least one of the plurality of heating lines has, between the first bus bar and the second bus bar, at least one fold-back portion at which a direction in which the heating line extends is changed.

Item 22. The laminated glass according to item 20, further including:
at least one relay bus bar arranged along an end portion closer to the first side or the second side, at a position different from the first bus bar and the second bus bar,
wherein the plurality of heating lines are connected from the first bus bar via the at least one relay bus bar to the second bus bar.

Item 23. The laminated glass according to item 16,
wherein at least some of the heating lines are formed to have a wave shape, and
an actual length of the heating lines having the wave shape relative to a length between two ends of the heating lines on the heat-generating layer is 103% or more.

Item 24. The laminated glass according to item 16,
wherein the heating lines are formed to have a sine wave shape, and an amplitude of the sine wave is 3 mm or more.

Item 25. The laminated glass according to item 16,
wherein electric resistivity of the heating lines is $3 \times 10^{-8}$ Ωm or less.

Item 26. The laminated glass according to item 25,
wherein the heating lines are made of copper.

Item 27. The laminated glass according to any one of items 1 to 26,
wherein at least a portion of the first and second bus bars extends along a peripheral edge of the glass plates.

Item 28. The laminated glass according to item 27,
wherein a width of each of the first and second bus bars is 10 mm or less.

Advantageous Effects of Invention

According to the laminated glass according to the present invention, flicker occurring when when an object outside a vehicle is viewed can be prevented by heat from the heating lines.

DESCRIPTION OF EMBODIMENTS

Figure 1:
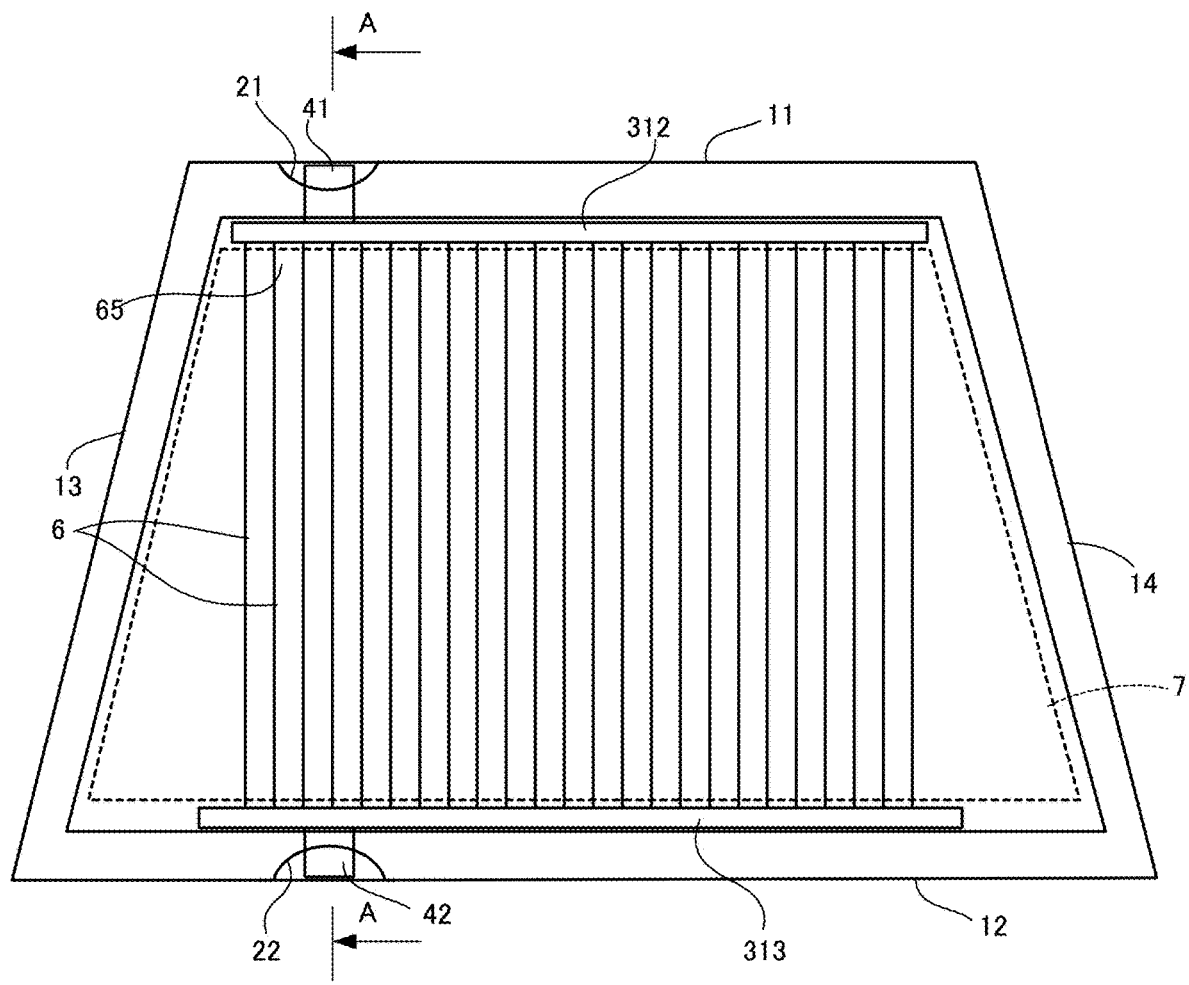
FIG. 1 is a front elevational view of an embodiment of laminated glass according to the present invention.
Figure 2:
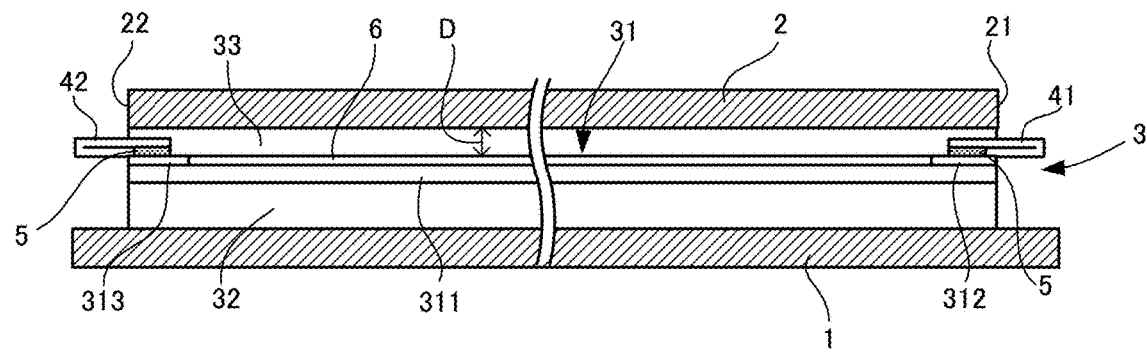
FIG. 2 is a cross-sectional view taken along a line A-A in FIG. 1.
Figure 3:
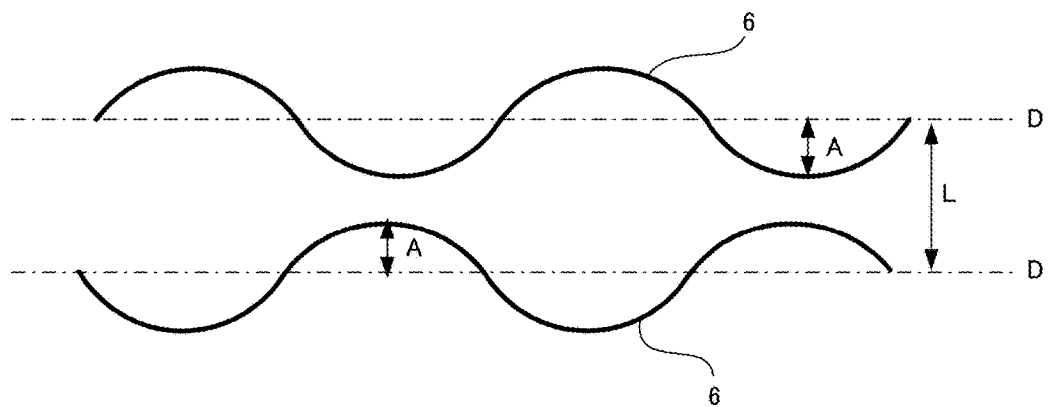
FIG. 3 shows an example of a heating line.

Hereinafter, a description will be given, with reference to the drawings, of an embodiment in which laminated glass according to the present invention is applied to a windshield. FIG. 1 is a plan view of a windshield according to this embodiment, and FIG. 2 is a cross-sectional view of FIG. 1. As shown in FIGS. 1 and 2, the windshield according to this embodiment includes an outer glass plate 1, an inner glass plate 2, and an intermediate layer 3, which is arranged between these glass plates 1 and 2. Cutout portions 21 and 22 are formed in an upper end portion and a lower end portion, respectively, of the inner glass plate 2. Connecting members 41 and 42, which extend from the intermediate layer 3, are exposed from the cutout portions 21 and 22, respectively. Each member will be described below.

1. Summary of Laminated Glass 1-1. Glass Plate

Both glass plates 1 and 2 are formed to have a rectangular shape with a lowerside 12 and an upperside 11, the lowerside 12 being longer than the upperside 11. That is to say, both glass plates 1 and 2 are formed to have a trapezoidal shape enclosed by the upperside 11, the lowerside 12, and two sides (a leftside 13 and a right side 14). As mentioned above, arc-shaped cutout portions are formed in the upper end portion and the lower end portion of the inner glass plate 2. In the following description, the cutout portion formed in the upper end portion of the inner glass plate 2 will be referred to as a first cutout portion 21, and the cutout portion formed in the lower end portion will be referred to as a second cutout portion 22. The glass plates 11 and 12 can be known glass plates, and can also be formed with heat absorbing glass, ordinary clear glass or green glass, or UV green glass. However, these glass plates 11 and 12 need to achieve visible light transmittance conforming to the safety standards in the country in which an automobile is used. For example, an adjustment can be made so that a required solar absorptivity is ensured in the outer glass plate 11, and the visible light transmittance satisfies the safety standards with the inner glass plate 12. Examples of compositions of clear glass, heat absorbing glass, and soda-lime glass are listed below.

Clear Glass $SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R denotes alkali metal)
Total iron oxide (T-$Fe_2O_3$) expressed in terms of $Fe_2O_3$:
 0.08 to 0.14 mass %

Heat Absorbing Glass

The composition of heat absorbing glass can be, for example, a composition that is based on the composition of clear glass, where the proportion of total iron oxide (T-$Fe_2O_3$) expressed in terms of $Fe_2O_3$ is 0.4 to 1.3 mass %, the proportion of $CeO_2$ is 0 to 2 mass %, the proportion of $TiO_2$ is 0 to 0.5 mass %, and the skeletal component (primarily, $SiO_2$ and $Al_2O_3$) of glass is reduced by the increased amount of T-$Fe_2O_3$, $CeO_2$, and $TiO_2$.

Soda-Lime Glass $SiO_2$: 65 to 80 mass %
$Al_2O_3$: 0 to 5 mass %
CaO: 5 to 15 mass %
MgO: 2 mass % or more
NaO: 10 to 18 mass %
$K_2O$: 0 to 5 mass %
MgO+CaO: 5 to 15 mass %
$Na_2O+K_2O$: 10 to 20 mass %
$SO_3$: 0.05 to 0.3 mass %
$B_2O_3$: 0 to 5 mass %
Total iron oxide (T-$Fe_2O_3$) expressed in terms of $Fe_2O_3$:
 0.02 to 0.03 mass %

As described above, the glass plates 1 and 2 are formed into a rectangular shape, and the length ratio between the upperside 11 and the lowerside 12 can be, for example, 1:1.04 to 1:1.5. For example, if the length of the upper side is 1200 mm, the length of the lower side can be 1250 to 1800 mm. Specifically, the length of the upper side can be 1195 mm, and the length of the lower side can be 1435 mm. Note that the aforementioned ratio is a ratio in a two-dimensional plane when the windshield is projected from the front side.

That is to say, although FIG. 1 illustrates an example in which the lowerside 12 is longer, the present invention can also be applied to a windshield whose upper side 11 is longer. For example, in the case of a windshield for a compact car for one person's use, if the length of the upper side is 500 mm, the length of the lower side can be 350 to 450 mm. Specifically, the length of the upper side may be 500 mm, and the length of the lower side may be 425 mm.

The thickness of the laminated glass according to this embodiment is not particularly limited. However, from the viewpoint of weight reduction, the total thickness of the outer glass plate 1 and the inner glass plate 2 is preferably 2.4 to 4.6 mm, more preferably 2.6 to 3.4 mm, and particularly preferably 2.7 to 3.2 mm. Since the total thickness of the outer glass plate 1 and the inner glass plate 2 thus needs to be reduced for weight reduction, the respective thicknesses of the outer glass plate 11 and the inner glass plate 12, which are not particularly limited, can be determined as follows, for example.

The outer glass plate 1 principally needs durability and shock resistance against an external obstacle. For example, in the case of using this laminated glass as an automobile windshield, shock resistance against a flying object, such as a small stone, is needed. Meanwhile, the larger the thickness is, the larger the weight is, which is not favorable. From this viewpoint, the thickness of the outer glass plate 1 preferably is 1.0 to 3.0 mm, and more preferably is 1.6 to 2.3 mm. The thickness to be employed can be determined in accordance with the usage of the glass.

The thickness of the inner glass plate 2 can be made equal to that of the outer glass plate 1, but can alternatively be made smaller than the thickness of the outer glass plate 11 for the reduction in the weight of the laminated glass, for example. Specifically, giving consideration to the glass strength, the thickness of the inner glass plate 2 is preferably 0.6 to 2.0 mm, more preferably 0.8 to 1.8 mm, and particularly preferably 0.8 to 1.6 mm. Furthermore, the thickness of the inner glass plate 2 is preferably 0.8 to 1.3 mm. The thickness of the inner glass plate 2 to be employed can also be determined in accordance with the usage of glass.

Note that, if later-described heating lines 6 included in the intermediate layer 3 are arranged at the center of the intermediate layer 3 in the thickness direction thereof, the thicknesses 1 and 2 of the glass plates may be made different from each other. Which of the glass plate is thicker depends on the main usage of the heating lines 6.

The shape of the outer glass plate 1 and the inner glass plate 2 according to this embodiment may also be a curved shape. However, if the glass plates 1 and 2 have a curved shape, it is considered that the larger the cross-curvature is, the lower the sound insulating property is. The cross-curvature refers to the amount indicating the curvature of a glass plate. When a line L that connects the center of an upper side of a glass plate to the center of a lower side is set, the largest distance between the line L and the glass plate is defined as a cross-curvature D.

There is no significant difference in sound transmission loss (STL) between the curved glass plates in the range of the cross-curvature from 30 to 38 mm, but the sound transmission loss of the curved glass plates is lower than that of the flat glass plate in a frequency band of 4000 Hz and smaller. Accordingly, in the case of producing a curved glass plate, a glass plate with a smaller cross-curvature is favorable. Specifically, the cross-curvature is preferably less than 30 mm, more preferably smaller than 25 mm, and particularly preferably smaller than 20 mm.

A description will now be given of an example of a method of measuring the thickness in the case where a glass plate is curved. First, measurement is performed at two positions, namely an upper position and a lower position on the center line that extends in the up-down direction, passing through the center of the glass plate in the left-right direction. There is no particular restriction on the type of measurement instrument, but a thickness gauge, such as the SM-112 manufactured by Teclock Corporation for example, can be used. During measurement, the glass plate is arranged so that the curved face thereof is placed on a flat face, and measurement is performed while holding an end portion of the glass plate using the aforementioned thickness gauge.

1-2. Intermediate Layer

Next, the intermediate layer 3 will be described. The intermediate layer 3 is constituted by three layers, which are a heat-generating layer 31, and a pair of adhesion layers 32 and 33 that sandwich the heat-generating layer 31. In the following description, the adhesion layer arranged on the outer glass plate 1 side will be referred to as a first adhesion layer 32, and the adhesion layer arranged on the inner glass plate 2 side will be referred to as a second adhesion layer 33.

Although the details will be described later, in this embodiment, the amount of heat generated by the heating lines 6, dimensions of the heating lines 6, such as the line width and the pitch thereof, and so on, are set to prevent flicker occurring when the windshield is heated by the heating lines 6. This point will be described first. Note that the pitch does not refer to the length of the gap between adjacent heating lines, but refers to the length obtained by adding the line width of each heating line to the length of the gap between adjacent heating lines.

As a result of the research conducted by the inventors, it has been found that the temperature of the heating lines 6 and therearound needs to be 60° C. or less in order to prevent flicker occurring when the outside of the vehicle is viewed through the windshield. For this purpose, the amount of heat generated by the heating lines 6 needs to be lowered. Here, the amount of heat generated can be calculated by Expression (1) below. The relationship between resistance of the heating lines 6 and the length and cross-sectional area of each heating line 6 is as indicated by Expression (2).

$$W=IV=RI^2=V^2/R \quad (1)$$

$$R=\rho(L/A) \quad (2)$$

Here, W: electric power, E: voltage, I: current, R: resistance, L: length, A: cross-sectional area, and ρ: electric resistivity Accordingly, based on Expressions (1) and (2) above, to reduce the amount of heat generated, strategies are available such as increasing the resistance R, increasing the length L of each heating line 6, increasing the cross-sectional area A or the line width of each heating line 6, and increasing the electric resistivity p. Meanwhile, if the amount of heat generated by each heating line 6 decreases, the number of heating lines 6 needs to be increased to maintain the amount of heat generated over the entire windshield. If the number of heating line 6 is increased, the pitch between adjacent heating lines 6 decreases. The members that constitute the intermediate layer 3 will be described below, while giving consideration to the above points.

1-2-1. Heat-Generating Layer

First, the heat-generating layer 31 will be described. The heat-generating layer 31 includes a sheet-shaped base 311, as well as a first bus bar 312, a second bus bar 313, and a plurality of heating lines 6, which are arranged on the base 311. The plurality of heating lines 6 are connected in parallel, with the bus bars 312 and 313 serving as electrodes. The base 311 can be formed into a rectangular shape so as to correspond to the shape of the glass plates 1 and 2, but does not necessarily have to have the same shape as the shape of the glass plates 1 and 2, and may also be smaller than the glass plates 1 and 2. For example, as shown in FIG. 1, the length of the base 311 in the up-down direction may be shorter than the length between the cutout portions 21 and 22 of the inner glass plate 2 so that the base 311 does not interfere with the cutout portions 21 and 22. Also, the length of the base 311 in the left-right direction may also be shorter than the width of the glass plates 1 and 2.

The first bus bar 312 is formed to extend along an upper side of the base 311. Meanwhile, the second bus bar 313 is formed to extend along a lower side of the base 311, and is formed longer than the first bus bar 312. However, the bus bars 312 and 313 are arranged inward of the aforementioned cutout portions 21 and 22, respectively, so as not to be exposed from the cutout portions 21 and 22 when the intermediate layer 3 is sandwiched between the glass plates 1 and 2. Note that the widths of the bus bars 312 and 313 in the up-down direction are preferably 5 to 50 mm, and more preferably 10 to 30 mm, for example. This is because, if the width of the bus bars 312 and 313 is smaller than 5 mm, there is concern that a "heat spot" phenomenon will occur and more heat will be generated therefrom than from the heating lines, and, on the contrary, if the width of the bus bars 312 and 313 is larger than 50 mm, there is a concern that the field of view will be interrupted by the bus bars 312 and 313. The bus bars 312 and 313 do not have to be formed accurately along the base 311. That is to say, the bus bars 312 and 313 do not have to be completely parallel to end edges of the base 311, and can also be curved, for example.

A plurality of heating lines 314 extend in the left-right direction so as to connect the bus bars 312 and 313 to each other. The plurality of heating lines 314 are arranged substantially parallel to each other. Each of the heating lines 314 can be formed into a straight shape, or can also be any of various shapes, such as a wave shape. In particular, by forming the heating lines 314 to have a sine wave shape, the heat distribution can be made uniform, and the heating lines 314 can be prevented from optically interrupting the field of view of the windshield. At this time, the amplitude of the sine wave is not particularly limited, but may be 3 mm or more, for example. The crimp ratio of the heating lines 6 may be 103 to 150%, for example. The crimp ratio refers to the ratio of the actual length (length along curves) of each heating line 6 to the length between two ends of each heating line 6 on the heat-generating layer 31. By thus setting the crimp ratio, L in Expression (2) can be increased. As a result, the resistance R increases, and accordingly, the amount of heat generated decreases, and flicker can be suppressed.

The line width of each heating line 6 is preferably 3 to 22 μm, more preferably 5 to 20 μm, and particularly preferably 8 to 15 μm. The heating lines 6 with a smaller width are more difficult to visually recognize, and are therefore suitable for the windshield according to this embodiment. Also, by thus setting the upper limit value of the line width, the cross-sectional area A in Expression (2) can be limited. As a result, the resistance R increases, and accordingly, the amount of heat generated decreases, and flicker can be suppressed. Note that the line width refers to the line width in the largest portion of the cross-sectional shape of each heating line 6. For example, if the cross-sectional shape of each heating line is a trapezoid, the width of the lower side is the line width, and if the cross-sectional shape of each heating line is a circular shape, the diameter is the line width. The width of each heating line 6 can be measured using a microscope, such as the VHX-200 manufactured by Keyence Corporation, at a magnification ratio of 1000, for example. The cross-sectional area of each heating line 6 is preferably 200 μm$^2$ or less, more preferably 150 μm$^2$ or less, and more preferably 100 μm$^2$ or less.

The pitch between adjacent heating lines 6 is preferably 0.5 mm or more and less than 5.0 mm, and more preferably 4.0 mm or less. Furthermore, the pitch between adjacent heating lines 6 is more preferably 0.5 to 3.5 mm, more preferably 0.5 to 3.0 mm and particularly preferably 1.25 to 3.0 mm. By thus setting the upper limit value of the pitch, for example, if the entire windshield is required to have a predetermined amount of heat generated (e.g. 400 W/m$^2$), the pitch can be reduced to increase the number of heating lines 6 even if the amount W of heat generated by each heating line 6 is reduced, as mentioned above, and therefore, a decrease in the amount of heat generated over the entire windshield can be prevented. Meanwhile, the lower limit value of the pitch has the following meaning. That is to say, the Announcement that Prescribes Details of Safety Regulations for Road Vehicles, Article 39 (window glass) gives a provision "regarding attachment, adhesion, painting, or inscription on window glass", and it is desirable that the pitch is 1.25 mm or more to meet this provision. There may be cases where each heating line 6 is formed to have a sine wave shape. There may also be cases where the positions of recesses and protrusions of the sine wave shape differ between adjacent heating lines 6, or the pitches between recesses or protrusions differ therebetween. In these cases, the pitch between heating lines 6 can be obtained by counting the number n of heating lines 6 in a predetermined region. For example, in the case where the predetermined region is a rectangular region that has sides with a width of 200 mm, if 101 heating lines 6 are arranged in this region, the pitch can be obtained as 200/(101−1)=2 mm. Also, it is preferable that the predetermined region is within the area of the test region A defined by JIS R3212. This is because the test region A under JIS R3212 is a region for carrying out tests of perspective distortion and the like, and prevention of flicker, which is the effect of the present application, is highly necessary in this region.

The length of each heating line 6 may be 1000 mm or more, for example. Otherwise, the length of each heating line 6 may also be 1100 mm or more, or may also be 1200 mm or more. Furthermore, the resistance of the heating lines 6 is preferably 30Ω or more, and more preferably 90Ω or more. The resistance R is increased by thus increasing the length of the heating lines, based on Expression (2), and therefore, the amount of heat generated is reduced, and flicker can be suppressed.

Measurement of the resistance R of the heating lines 6 will now be described. Although measurement can be carried out using a commercially-available electrical resistance measuring device, as an example, the Digital Multimeter 73200 series manufactured by Yokogawa Test & Measurement Corporation can be used in measurement. To carry out the measurement, initially, a heating line to be measured is selected. Next, one terminal of the electrical resistance measuring device is connected to a portion near the bus bar 312 of this heating line, and the other terminal is connected to a portion near the bus bar 313 of this heating line. Note that, if, as shown in FIG. 1, the heating line is sandwiched by the outer glass plate 1 and the inner glass plate 2, and the terminals of the electrical resistance measuring device cannot be connected to the heating line, the outer glass plate 1 or the inner glass plate 2 can be broken to measure the resistance R of the heating line 6. When the heating line to be measured is connected to an adjacent heating line by a bridge (not shown), the resistance R of the heating line to be measured is measured after the bridge is turned off.

The amount of heat generated per unit length of each heating line 6 is preferably 2.0 W/m or less when, for example, a voltage of 13.5 V is applied between the bus bars 312 and 313, more preferably 1.5 W/m or less, or particularly preferably 1.0 W/m or less. As a more specific range, for example, a range from 1.5 W/m to 2.0 W/m, from 1.35 W/m to 1.5 W/m, from 1.20 W/m to 1.35 W/m, from 1.0 W/m to 1.20 W/m, from 0.8 W/m to 1.0 W/m, or from 0.5 W/m to 0.8 W/m may be employed. Using such heating lines 6, the amount of heat generated per unit area of the windshield is preferably 400 W/m$^2$ or more, more preferably 500 W/m$^2$ or more, and particularly preferably 600 W/m$^2$ in order to effectively melt ice, for example.

Note that, although the amount of heat generated when a voltage of 13.5 V is applied has been described above, the voltage to be applied is not limited thereto, and different voltages may be applied between different vehicles, such as an automobile, a train, and a ship. For example, a voltage of 400 V or less is applied in some cases, and meanwhile, a voltage of 50V or less is applied in other cases. However, whatever voltage is applied, it is preferable that the amount of heat generated per unit length or the amount (heating amount) of heat generated per unit area takes any of the aforementioned values. The following description will be given while assuming that the voltage to be applied is 13.5 V for convenience, but the voltage to be applied is not limited thereto, as mentioned above. That is to say, the present invention is also applicable to the cases where a voltage that is not 13.5 V is applied, and various dimensions and physical values such as the resistance value, including the already-described values, may be used regarding the heating lines 6.

As for the width of each of the bus bars 312 and 313 relative to the line width of each heating line 6, it is preferable that S=(bus bar width/heating line width)≤1000. For example, if the width of each of the bus bars 312 and 313 is 8 mm, and the line width of each heating line 6 is 10 μm, S=800. Thus, if S≤1000, a greater amount of heat can be generated on the bus bar 312 side and the bus bar 313 side compared with the case where the width of each of the bus bars 312 and 313 is excessively larger than the width of each heating line 6. As a result, heat generation from the heating lines 6 is suppressed, and flicker is mitigated.

Next, the material of the heat-generating layer 31 will be described. The base 311 is a transparent film that supports the bus bars 312 and 313 and the heating lines 6. Although the material of the base 311 is not particularly limited, the base 311 can be formed with polyethylene terephthalate, polyethylene, polymethyl metacrylate, polyvinyl chloride, polyester, polyolefin, polycarbonate, polystyrene, polypropylene, nylon, or the like, for example. Alternatively, the base 311 may also be formed with polyvinyl butyral resin (PVB), ethylene vinyl acetate (EVA), or the like. The bus bars 312 and 313 and the heating lines 6 can be formed with the same material, and can be formed with any of a variety of materials such as copper (or tinned copper), gold, aluminum, magnesium, cobalt, tungsten, and silver. Of these materials, it is particularly preferable to use any of silver, copper, gold, and aluminum, which are materials with an electric resistivity of 3.0×10$^{-8}$ Ωm or less. If the electric resistivity of the heating lines 6 is thus reduced, the resistance R decreases based on Expression (2), and therefore the amount of heat generated tends to increase. However, flicker can be suppressed by adjusting the pitch between the heating lines 6, and the length, cross-sectional area, and line width of each heating line 6.

Next, a method for forming the bus bars 312 and 313 and the heating lines 6 will be described. If the bus bars 312 and 313 and the heating lines 6 each have a line width of 10 μm or larger, they may be directly printed on the glass plates 1 and 2 using a conductive material. In this case, since the glass plates can be directly heated to form the heating lines, that is, an intermediate film need not be heated when the heating lines 6 are formed, occurrence of perspective distortion due to deformation of the intermediate film can be suppressed. Also, the bus bars 312 and 313 and the heating lines 6 can also be formed by arranging fine lines (such as wires) that are formed in advance, or the like, on the base 311. In particular, to further thin the line width of the heating lines 6, the heating lines 6 can be formed by patterning them on the base 311. The method thereof is not particularly limited, but various methods such as printing, etching, and transferring can be used in this patterning. At this time, the bus bars 312 and 313 and the heating lines 6 can be formed separately, or can also be formed integrally. Note that "integrally formed" means that the bus bars 312 and 313 and the heating lines 6 are formed seamlessly in the material thereof, and no interface is present therebetween.

The bus bars 312 and 313 are formed on the base 311, and the base 311 in portions that correspond to the bus bars 312 and 313 are peeled off and removed, while leaving the base 311 for the heating lines 6. Thereafter, the heating lines can also be arranged on the base between the bus bars 312 and 313.

In particular, in the case of employing etching, the following process can be applied as an example. First, metal foil is attached to the base 311 via a primer layer by means of dry lamination. Copper can be used as the metal foil, for example. Then, a chemical etching process using photolithography is performed on the metal foil, and thus, the bus bars 312 and 313 and the plurality of heating lines 6 can be integrally patterned on the base 311. In particular, in the case of reducing the line width of the heating lines 6 (e.g. to 15 μm or smaller), it is preferable to use thin metal foil. A process may be employed in which a thin metal layer (e.g. of 5 μm or smaller) is formed on the base 311 by means of evaporation, spattering, or the like, and thereafter, patterning is carried out using photolithography. Note that the surface of the heating lines 6, i.e. the surface thereof on the inner glass plate 2 side is blackened, making it possible to keep the heating lines 6 from being visually recognized from the vehicle inner side. Examples of the material for the blackening may include copper nitride, copper oxide, nickel nitride, nickel chrome, and so on, and blackening can be carried out through plating using any of these materials.

1-2-3. Adhesion Layer

The adhesion layers 32 and 33 are sheet-shaped members for sandwiching the heat-generating layer 31 and adhering the heat-generating layer 31 to the glass plates 1 and 2. The adhesion layers 32 and 33 are formed to have the same size as the glass plates 1 and 2, and cutout portions that have the same shape as that of the cutout portions 21 and 22 of the inner glass plate 2 are formed at positions on the adhesion layers 32 and 33 corresponding to the cutout portions 21 and 22, respectively. The adhesion layers 32 and 33 can be formed with any of a variety of materials, and can be formed with, for example, polyvinyl butyral resin (PVB), ethylene vinyl acetate (EVA), or the like. In particular, polyvinyl butyral resin is favorable in terms of excellent adhesiveness to the glass plates and penetration resistance. Note that a surfactant layer can also be provided between each of the adhesion layers 32 and 33 and the heat-generating layer 31. This surfactant can improve the surfaces of both layers and increase adhesiveness.

1-2-4. Thickness of Intermediate layer

The total thickness of the intermediate layer 3 is not particularly defined, but is preferably 0.3 to 6.0 mm, more preferably 0.5 to 4.0 mm, and particularly preferably 0.6 to 2.0 mm. The thickness of the base 311 of the heat-generating layer 31 is preferably 5 to 200 mm, and more preferably 5 to 100 mm. Meanwhile, it is preferable that the thickness of the adhesion layers 32 and 33 is preferably larger than the thickness of the heat-generating layer 31. Specifically, the thickness of the adhesion layers 32 and 33 is preferably 0.05 to 2.0 mm, and more preferably 0.05 to 1.0 mm. Furthermore, although the details will be described later, giving consideration to the ease of heat releasing from the heating lines 6 to the glass plates 1 and 2, it is preferable that the thickness of each of the adhesion layers 32 and 33 is smaller, and specifically, it is preferable that the thickness thereof is 0.05 to 0.4 mm. The thicknesses of the adhesion layers 32 and 33 may be the same, or may be made different from each other. Note that, to closely adhere the second adhesion layer 33 to the base 311, it is preferable that the thickness of the bus bars 312 and 313 and the heating lines 6 that are sandwiched therebetween is 3 to 20 μm.

The thickness of the heat-generating layer 31 and the adhesion layers 32 and 33 can be measured as follows, for example. Initially, a cross-section of the laminated glass is displayed at a magnification ratio of 175 by a microscope (e.g. the VH-5500 manufactured by Keyence Corporation). Then, the thickness of the heat-generating layer 31 and the adhesion layers 32 and 33 is specified by a visual check, and the visually-specified thickness is measured. At this time, to eliminate variation due to the visual check, the measurement is performed five times, and the average value of measurement values obtained through this measurement are used as the thickness of the heat-generating layer 31 and the adhesion layers 32 and 33.

The thickness of the heat-generating layer 31 and the adhesion layers 32 and 33 of the intermediate layer 3 does not need to be uniform over the entire surface. For example, these layers can be formed into a wedge shape for laminated glass to be used in a head-up display. In this case, the thickness of the heat-generating layer 31 and the adhesion layers 32 and 33 of the intermediate layer 3 is measured at a portion with the smallest thickness, i.e. a lowermost side portion of the laminated glass. If the intermediate layer 3 has a wedge shape, the outer glass plate 1 and the inner glass plate 2 are not arranged parallel to each other, but glass plates in such an arrangement is also included in the glass plate according to the present invention. That is to say, the present invention includes an arrangement of the outer glass plate 1 and the inner glass plate 2 in the case of using an intermediate layer 3 that includes the heat-generating layer 31 and the adhesion layers 32 and 33 whose thickness increases at a rate of change of 3 mm per meter or less, for example.

1-3. Connecting Material

Next, the connecting materials will be described. The connecting members 41 and 42 are for connecting the bus bars 312 and 313, respectively, to connection terminals (anode terminal or cathode terminal: not shown in the diagram), and are formed into a sheet shape with a conductive material. A voltage of 12 V or more, e.g. a power supply voltage of 13.5 V, is applied to these connection terminals. In the following description, the connecting member connected to the first bus bar 312 will be referred to as a first connecting member 41, and the connecting member connected to the second bus bar 313 will be referred to as a second connecting member 42. Since the connecting members 41 and 42 have the same configuration, the following will mainly describe the first connecting member 41.

The first connecting member 41 is formed into a rectangular shape, and is sandwiched between the first bus bar 312 and the second adhesion layer 33. The first connecting member 41 is then fixed to the first bus bar 312 by a fixing material 5, such as solder. It is preferable that, for example, solder with a low melting point of 150° C. or lower is used as the fixing material 5 so that the first connecting material 41 can be fixed by means of autoclave at the same time as later-described assembly of the windshield. The first connecting member 41 extends from the first bus bar 312 to an upper end edge of the outer glass plate 1, and is exposed from the first cutout portion 21 that is formed in the inner glass plate 2. A connection terminal, to which a cable extending to a power source is connected, is connected to this exposed portion via a fixing material such as solder. Thus, connection terminals are fixed to the portions of the connecting members 41 and 42 that are exposed from the cutout portions 21 and 22 of the inner glass plate 2, whereas the connecting members 41 and 42 do not protrude from end portions of the glass plates 1 and 2. Note that the connecting members 41 and 42 are made of a thin material, and can thus be folded and then fixed, at their end portions, to the bus bar 312 via the fixing material 5, as shown in FIG. 2.

1-4. Obstructing Layer

As shown in FIG. 1, an obstructing layer 7 that is made of ceramic, whose color is black or a dark color, is laminated at the periphery of this laminated glass. The obstructing layer 7 is for obstructing the field of view from inside and outside of a vehicle, and is laminated along the four sides of the laminated glass. The bus bars 312 and 313 are arranged at positions at which they are covered by the obstructing layer 7. Note that the reference numeral 7 in the drawing denotes the inner periphery of the obstructing layer 7.

The obstructing layer 7 may be provided in various manners, e.g. only on an inner face of the outer glass plate 11, only on an inner face of the inner glass plate 12, or on the inner face of the outer glass plate 11 and the inner face of the inner glass plate 12. The obstructing layer 7 may be made of ceramic or any of various materials, and may have the following composition, for example.

TABLE 1

1st table

|  |  | First and Second Colored Ceramic Paste |
|---|---|---|
| Pigment *1 | mass % | 20 |
| Resin (Cellulosic Resin) | mass % | 10 |
| Organic Solvent (Pine Oil) | mass % | 10 |
| Glass Binder *2 | mass % | 65 |
| Viscosity | dPs | 150 |

*1, Main ingredients: copper oxide, chromium oxide, iron oxide, and manganese oxide
*2, Main ingredients: bismuth borosilicate, zinc borosilicate The ceramic can be formed by means of screen printing, but can also be manufactured by transferring a transfer film for firing onto a glass plate and firing this glass plate. In the case of employing screen printing, for example, the following conditions may be employed: polyester screen: 355 mesh, coat thickness: 20 μm, tension: 20 Nm, squeegee hardness: 80 degrees, attachment angle: 75°, and printing speed: 300 mm/s, and the ceramic can be formed after being dried in a drying oven at 150° C. for 10 minutes.

The obstructing layer 7 can also be formed not only by laminating a ceramic, but also by attaching an obstructing film that is made of a dark-color resin.

2. Method of Manufacturing Windshield

Next, a method of manufacturing the windshield will be described. First, a manufacturing line for the glass plates will be described.

Figure 4:
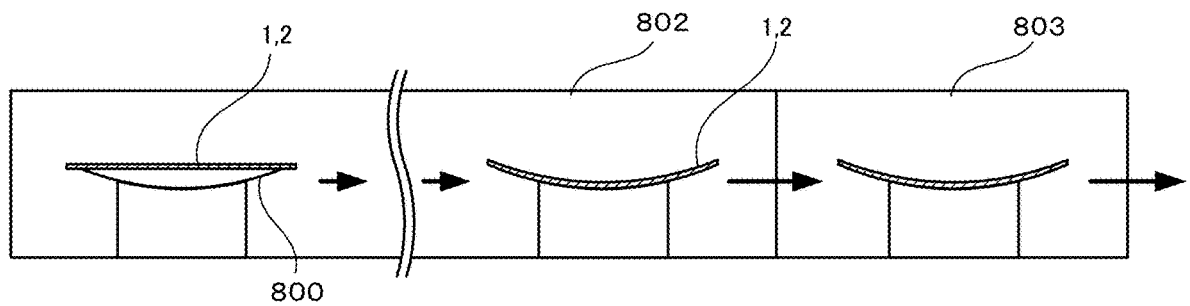
FIG. 4 is a side view of a furnace through which a molding tool passes.
Figure 5:
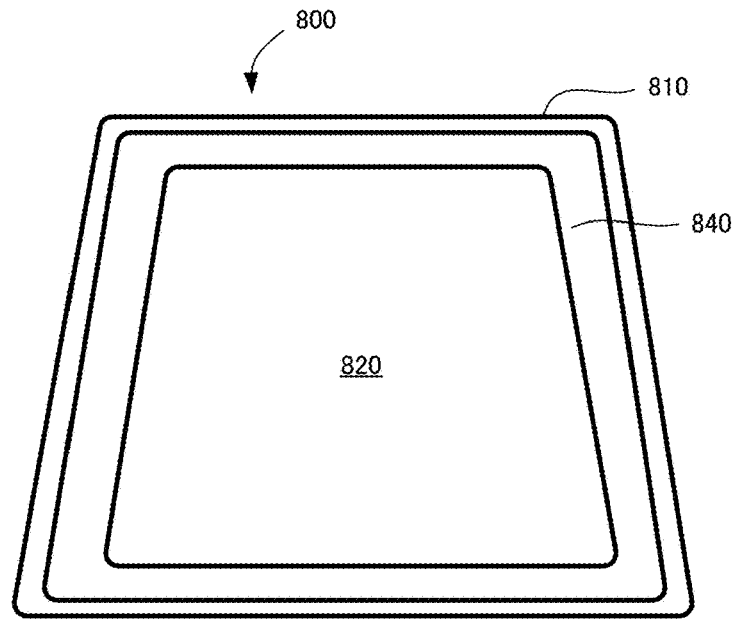
FIG. 5 is a plan view of the molding tool. intermediate layer.

Here, a more detailed description will be giving of a molding tool, with reference to FIGS. 4 and 5. FIG. 4 is a side view of a furnace through which the molding tool passes, and FIG. 5 is a plan view of the molding tool. As shown in FIG. 5, a molding tool 800 includes a frame-shaped molding body 810, whose shape substantially coincides with the outer shape of the glass plates 1 and 2. Since the molding body 810 is formed into a frame shape, an internal space 820, which penetrates in the up-down direction, is formed therewithin. Peripheral portions of the glass plates 1 and 2, which have a flat plate shape, are placed on the upper face of the molding body 810. For this reason, heat is applied to the glass plates 1 and 2 from a heater (not shown in the diagram), which is arranged on the lower side, via the internal space 820. Thus, the glass plates 1 and 2 are softened by the applied heat, and are bent downward due to their own weight. In some cases, a shielding plate 840 for heat shielding is arranged on the inner peripheral edge of the molding body 810, so that the heat received by the glass plates 1 and 2 can be adjusted thereby. The heater can be provided not only below but also above the molding tool 800.

Then, the aforementioned obstructing layer 7 is laminated onto the outer glass plate 1 and the inner glass plate 2, which have a flat-plate shape, then the outer glass plate 1 and the inner glass plate 2 are laminated, and pass through a heating furnace 802 while being supported by the molding tool 800, as shown in FIG. 4. Upon being heated to a temperature close to the softening temperature within the heating furnace 802, the inner side of the glass plates 1 and 2 bend downward relative to the peripheral portion, due to their own weight, and are formed into a curved face. Subsequently, the glass plates 1 and 2 are brought into an annealing furnace 803 from the heating furnace 802, and an annealing process is performed. Thereafter, the glass plates 1 and 2 are brought out of the annealing furnace 803 and are cooled.

After the outer glass plate 11 and the inner glass plate 12 have thus been formed, subsequently, the intermediate layer 3 is sandwiched between the outer glass plate 11 and the inner glass plate 12. Specifically, first, the outer glass plate 1, the first adhesion layer 32, the heat-generating layer 31, the second adhesion layer 33, and the inner glass plate 2 are laminated in this order. At this time, the face of the heat-generating layer 31 in which the first bus bar 312 and so on are formed is oriented toward the second adhesion layer 33 side. Upper and lower end portions of the heat-generating layer 31 are arranged inward of the cutout portions 21 and 22 of the inner glass plate 2. Furthermore, the cutout portions of the first and second adhesion layers 32 and 33 are matched with the cutout portions 21 and 22 of the inner glass plate 2. Thus, the outer glass plate 1 is exposed from the cutout portions 21 and 22 of the inner glass plate 2. Subsequently, the connecting members 41 and 42 are inserted between the heat-generating layer 31 and the second adhesion layer 33 from the cutout portions 21 and 22, respectively. At this time, solder with a low melting point, which serves as the fixing material 5, is applied to the connecting members 41 and 42, so that this solder is arranged on the bus bars 312 and 313.

A laminated body in which the glass plates 1 and 2, the intermediate layer 3, and the connecting members 41 and 42 are thus laminated is put into a rubber bag, and is subjected to preliminary adhesion at about 70 to 110° C. while being subjected to a reduced-pressure suction. Any other method can alternatively be used in preliminary adhesion, and the following method can also be employed. For example, the aforementioned laminated body is heated to to 65° C. by an oven. Next, this laminated body is pressed by a roll at 0.45 to 0.55 Mpa. Subsequently, this laminated body is heated again to 80 to 105° C. by the oven, and is then pressed again at 0.45 to 0.55 Mpa by the roller. Preliminary adhesion is thus completed.

Next, main adhesion is performed. The laminated body after having undergone preliminary adhesion is subjected to main adhesion with 8 to 15 atm at 100 to 150° C., for example, by means of autoclave. Specifically, for example, main adhesion can be performed under the condition of 14 atm and 135° C. The adhesion layers 32 and 33 are adhered to the glass plates 1 and 2, respectively, with the heat-generating layer 31 therebetween, through the above-described preliminary adhesion and main adhesion. Furthermore, the solder on the connecting members 41 and 42 melts, and the connecting members 41 and 42 are fixed to the bus bars 312 and 313, respectively. The laminated glass according to this embodiment is thus manufactured. Note that a curved windshield can also be manufactured using other methods, such as press working.

3. Method of Using Windshield

The windshield that is configured as described above is attached to a vehicle body, and connection terminals are fixed to the connecting members 41 and 42. Thereafter, upon electric power being supplied to the connection terminals, a current is applied to the heating lines 6 via the connecting members 41 and 42 and the bus bars 312 and 313, and heat is generated. With the generated heat, the surface on the vehicle-inner side of the windshield can be defogged, or ice on the surface on the vehicle-outer side can be melted.

4. Features

As described above, the following effects can be achieved according to the present embodiment.

(1) The inventors of the present application found that, when a voltage is applied to the heating lines to heat laminated glass, flicker occurs on an object outside the vehicle when the outside of the vehicle is viewed through the laminated glass. As a result of examining the cause of this flicker, the inventors found that a resin layer around the heating lines 6 is distorted by the heat from the heating lines, and the refractive index of an intermediate layer changes due to this distortion. It is also understood that flicker occurs due to the change in the refractive index.

Furthermore, the inventors of the present application particularly found that the aforementioned flicker occurs if the temperature of the heating lines 6 and therearound exceeds about 60° C. Then, the inventors of the present application found that flicker can be prevented by setting the amount of heat generated per unit of the heating lines 6 to 2.0 W/m or less when a voltage of 13.5 V is applied between the bus bars 312 and 313 in order to keep the temperature of the heating lines 6 and therearound from exceeding about 60° C. Accordingly, the windshield according to this embodiment is configured such that the amount of heat generated per unit length of each heating line 6 is 2.0 W/m or less when a voltage of 13.5V is applied between the bus bars 312 and 313. This configuration makes it possible to suppress the temperature of the heating lines 6 and therearound to about 60° C. or less, and, as a result, flicker occurring when the outside of the vehicle is viewed through the windshield can be prevented.

The inventors of the present application found that the aforementioned problem occurs particularly significantly when the heating lines 6 are arranged near the center in the thickness direction of the intermediate layer 3. For example, if the heating lines 6 are arranged at positions shifted from the center in the thickness direction of the intermediate layer 3, the heating lines 6 are then located closer to either the glass plate 1 or 2, and heat from the heating lines 6 can be more readily released to the glass plate 1 or 2. Thus, the temperature of the heating lines 6 and therearound can be lowered. Technical advances in the aforementioned etching and the like is making it possible to further reduce the line width of each heating line 6. However, a base material such as the base material 311 in this embodiment is needed to carry out etching, and if this kind of base material 311 is used, the base material 311 cannot be directly adhered to the glass plates 1 and 2 depending on the material. Therefore, adhesion layers such as the adhesion layers 32 and 33 in this embodiment are needed. This results in the heating lines 6 being arranged separately from the glass plates 1 and 2, and there is a possibility that heat generated from the heating lines 6 cannot be sufficiently released. For this reason, in this embodiment, the temperature of the heating lines 6 and therearound is lowered by adjusting the amount of heat generated per unit length of each heating line 6 as described above.

In this embodiment, the amount of heat generated per unit area of the windshield is 400 W/m² or more. Thus, the windshield can be defogged, or ice or the like on the windshield can be melted. To achieve this property, it is commonly conceivable to increase to increase the amount of heat generated per unit area. However, to increase the amount of heat generated, the amount of heat generated per unit length of each heating line 6 needs to be increased, but there is concern that this will cause the aforementioned flicker. In this regard, in this embodiment, the amount of heat generated per unit length of each heating line 6 is reduced while maintaining the amount of heat generated per unit area of the windshield. Although various strategies therefor can be examined, for example, it is possible to increase the number of heating lines 6 and shorten the pitch between the heating lines 6. From this viewpoint, in this embodiment, the pitch between the heating lines 6 is set as mentioned above. In addition, the width, length, thickness, material, and so on, of the heating lines 6 can also be adjusted. Example settings of the heating lines 6 will be described below.

For example, the case will be examined where the heat-generating region in the windshield is set to be 958 mm long and 1180 mm wide, a voltage of 13.5 V is applied between the bus bars 312 and 313, and the amount of heat generated per unit area is set to 500 W/m². First, the heating lines 6 are set as follows.

TABLE 2

| | |
|---|---|
| Power (W) | 565 |
| Total resistance (Ω) | 0.32 |
| Heating line lower side width (μm) | 12 |
| Heating line upper side width (μm) | 10 |
| Heating line thickness (μm) | 12 |
| Heating line cross-sectional area (m²) | $1.32 \times 10^{-10}$ |
| Conductivity (Ω·m) | $1.80 \times 10^{-3}$ |
| Crimp ratio (%) | 120% |
| Heating line length (m) | 1.15 |
| Heating line resistance (Ω) | 157 |
| Number of heating lines | 486 |
| Heating line pitch (mm) | 2.4 |

Of these settings, the pitch between the heating lines was varied between 1.0 to 6.0 mm while keeping the amount of heat generated per unit area to 500 W/m². In this case, for example, the number of heating lines 6, the resistance, current, and power per heating line, and the amount of heat generated per unit length of each heating line can be set in the following patterns 1 to 8 (other settings are as shown in Table 2). However, patterns 7 and 8 are not appropriate since the amount of heat generated per unit length of each heating line exceeds 2 W/m.

TABLE 3

|  | 1 | 2 | 3 | 4 | 5 | 6 | 7 | 8 |
|---|---|---|---|---|---|---|---|---|
| Heating line pitch (mm) | 1.0 | 1.5 | 2.0 | 2.5 | 3.0 | 4.0 | 5.0 | 6.0 |
| Number of heating lines (lines) | 1180 | 787 | 590 | 472 | 393 | 295 | 236 | 197 |
| Heating line resistance (Ω) | 380 | 254 | 190 | 152 | 127 | 95 | 76 | 63 |
| Heating line current (A) | 0.04 | 0.05 | 0.07 | 0.09 | 0.11 | 0.14 | 0.18 | 0.21 |
| Heating line power (W) | 0.48 | 0.72 | 0.96 | 1.20 | 1.44 | 1.92 | 2.40 | 2.87 |
| Heating line amount of heat generated per length (W/m) | 0.42 | 0.63 | 0.83 | 1.04 | 1.25 | 1.67 | 2.08 | 2.50 |

Based on the settings in Table 2 above, settings can be configured as in the following patterns 1 to 6 when the width of each heating line 6 is changed.

TABLE 4

|  | 1 | 2 | 3 | 4 | 5 | 6 |
|---|---|---|---|---|---|---|
| Heating line lower side width (μm) | 5.0 | 8.0 | 10.0 | 12.0 | 18.0 | 22.0 |
| Heating line upper side width (μm) | 3.0 | 6.0 | 8.0 | 10.0 | 16.0 | 20.0 |
| Heating line cross-sectional area (m$^2$) | 4.80.E−11 | 8.40.E−11 | 1.08.E−10 | 1.32.E−10 | 2.04.E−10 | 2.52.E−10 |
| Heating line resistance (Ω) | 431 | 246 | 192 | 157 | 101 | 82 |
| Number of heating lines (lines) | 1337 | 764 | 594 | 486 | 315 | 255 |
| Heating line pitch (mm) | 0.88 | 1.54 | 1.99 | 2.43 | 3.75 | 4.63 |
| Heating line power (W) | 0.42 | 0.74 | 0.95 | 1.16 | 1.80 | 2.22 |
| Heating line amount of heat generated per length (W/m) | 0.37 | 0.64 | 0.83 | 1.01 | 1.56 | 1.93 |

Based on the settings in Table 2 above, settings can be configured as in the following patterns 6 to 1 when the thickness of each heating line 6 is changed.

TABLE 5

|  | 1 | 2 | 3 | 4 | 5 | 6 |
|---|---|---|---|---|---|---|
| Heating line thickness (μm) | 5.0 | 8.0 | 10.0 | 12.0 | 15.0 | 20.0 |
| Heating line cross-sectional area (m$^2$) | 5.50.E−11 | 8.80.E−11 | 1.10.E−10 | 1.32.E−10 | 1.65.E−10 | 2.20.E−10 |
| Heating line resistance (Ω) | 376 | 235 | 188 | 157 | 125 | 94 |
| Number of heating lines (lines) | 1167 | 729 | 583 | 486 | 389 | 292 |
| Heating line pitch (mm) | 1.01 | 1.62 | 2.02 | 2.43 | 3.03 | 4.05 |

TABLE 5-continued

|  | 1 | 2 | 3 | 4 | 5 | 6 |
|---|---|---|---|---|---|---|
| Heating line power (W) | 0.48 | 0.78 | 0.97 | 1.16 | 1.45 | 1.94 |
| Heating line amount of heat generated per length (W/m) | 0.42 | 0.67 | 0.84 | 1.01 | 1.26 | 1.69 |

Based on the settings in Table 2 above, settings can be configured as in the following patterns 6 to 1 when the length of each heating line 6 is changed. To increase the length of each heating line 6, each heating line 6 needs to be provided with a bent portion (crimp) since the distance between the two bus bars is fixed. If a bent portion is thus provided, the length of each heating line 6 can be made longer than or equal to the distance between the first bus bar 312 and the second bus bar 313.

TABLE 6

|  | 1 | 2 | 3 | 4 | 5 | 6 |
|---|---|---|---|---|---|---|
| Crimp (%) | 105% | 110% | 115% | 120% | 130% | 150% |
| Heating line length (m) | 1.01 | 1.05 | 1.10 | 1.15 | 1.25 | 1.44 |
| Heating line resistance (Ω) | 137 | 144 | 150 | 157 | 170 | 196 |
| Number of heating lines (lines) | 425 | 446 | 466 | 486 | 527 | 608 |
| Heating line pitch (mm) | 2.77 | 2.65 | 2.53 | 2.43 | 2.24 | 1.94 |
| Heating line power (W) | 1.33 | 1.27 | 1.21 | 1.16 | 1.07 | 0.93 |
| Heating line amount of heat generated per length (W/m) | 1.32 | 1.20 | 1.10 | 1.01 | 0.86 | 0.65 |

Based on the settings in Table 2 above, settings can be configured as in the following patterns 1 to 8 when the material of the heating lines 6 is changed.

TABLE 7

| | 1 | 2 | 3 | 4 | 5 | 6 | 7 | 8 |
|---|---|---|---|---|---|---|---|---|
| Material | Silver | Copper 1 | Copper 2 | Gold | Aluminum | Magnesium | Tungsten | Cobalt |
| Conductivity (Ω · m) | 1.59.E−08 | 1.68.E−08 | 1.80.E−08 | 2.44.E−08 | 2.82.E−08 | 4.42.E−06 | 5.51.E−08 | 5.81.E−08 |
| Heating line resistance (Ω) | 138 | 146 | 157 | 213 | 246 | 385 | 480 | 506 |
| Number of heating lines (lines) | 429 | 454 | 486 | 659 | 762 | 1194 | 1488 | 1569 |
| Heating line pitch (mm) | 2.75 | 2.60 | 2.43 | 1.79 | 1.55 | 0.99 | 0.79 | 0.75 |
| Heating line power (W) | 1.32 | 1.25 | 1.16 | 0.86 | 0.74 | 0.47 | 0.38 | 0.36 |
| Heating line amount of heat generated per length (W/m) | 1.14 | 1.08 | 1.01 | 0.75 | 0.65 | 0.41 | 0.33 | 0.31 |

(2) Since the bus bars 312 and 313 and the heating lines 6 are made of the same material, the bus bars 312 and 313 and the heating lines 6 have the same coefficient of linear expansion. For this reason, there is the following advantage. If the bus bars 312 and 313 and the heating lines 6 are formed with different materials, the bus bars 312 and 313 and the heating lines 6 have different coefficients of linear expansion. Then, if, for example, these members are separately produced and fixed, problems may occur, e.g. the heating lines may come off of the bus bars, which may further cause the two glass plates that constitute the laminated glass to be raised relative to each other, due to a harsh change in the environment, such as that during a heat cycle test. However, such problems can be prevented by forming the bus bars 312 and 313 and the heating lines 6 with the same material as in this embodiment.

(3) Since the bus bars 312 and 313 and the heating lines 6 are formed integrally, a failure in the contact therebetween and a failure in heat generation can be prevented. A failure in heat generation will be described below in detail. Ordinarily, in the case of heating a glass plate for preventing fogging, current value control is required so that the upper limit value of the heating temperature is 70 to 80° C., for example, in order to prevent glass cracking. In this regard, if heat is locally generated due to the aforementioned contact resistance, current value control is needed with the temperature in the portion where heat is locally generated as the upper limit value of the heating temperature. As a result, the heating lines cannot be entirely controlled to sufficiently generate heat. However, the above-described configuration can prevent local heat generation, and it is therefore also possible to control the entire heating lines to sufficiently generate heat.

(4) The heat-generating layer 31 in which the bus bars 312 and 313 and the heat-generating layer 6 are arranged is sandwiched by the adhesion layers 32 and 33, and is arranged between the glass plates 1 and 2. As a result, the heat-generating layer 31 can be reliably fixed to the glass plates 1 and 2. Also, by covering the bus bars 312 and 313 and the heating lines 6 with the second adhesion layer 33, these members can be prevented from coming into contact with the glass plates. As a result, the glass plates can be prevented, in advance, from cracking.

(5) In the above embodiment, the bus bars 312 and 313 are connected to external terminals using two connecting members 41 and 42. However, for example, it is also conceivable that wide bus bars are prepared, unnecessary portions of these bus bars are cut off, and thereafter the bus bars are partially exposed from the cutout portions 21 and 22, thereby substituting the connecting members. However, it is also conceivable that this configuration will cause heat to be locally generated at corners of the cut bus bars. In this regard, in this embodiment, separate connecting members 41 and 42 are fixed to the respective bus bars 312 and 313, and it is therefore possible to prevent such local heat generation.

(6) In this embodiment, the bus bars 312 and 313 are arranged along the upper sides 11 and the lower sides 12, respectively, of the glass plates 1 and 2. This configuration makes it possible to cover the bus bars 312 and 313 with the obstructing layer 7, improving the appearance.

5. Modifications

Although one embodiment of the present invention has been described so far, the present invention is not limited to the above embodiment, and can be modified in various manners without departing from the gist thereof. Also, the following modifications can be combined as appropriate.

5.1

In the above embodiment, the bus bars 312 and 313 are formed so as to be covered by the obstructing layer 7, but this may not be the case, and the bus bars 312 and 313 do not need to be covered by the obstructing layer 7. Also, the obstructing layer 7 does not necessarily need to be provided.

5.2

Figure 6:
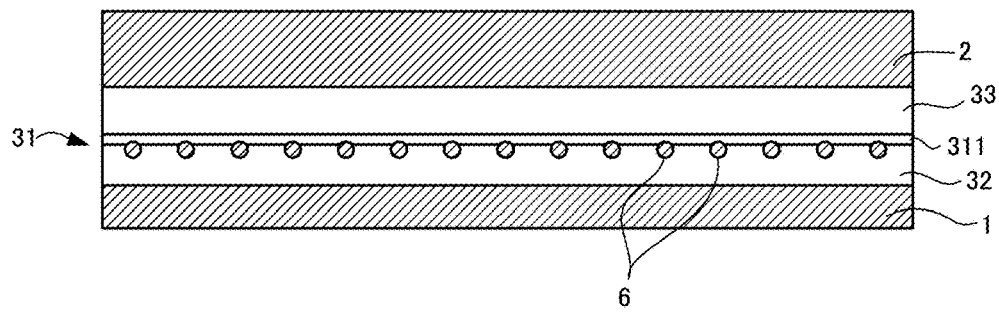
FIG. 6 is a cross-sectional view showing another example of the laminated glass in FIG. 1.
Figure 7:
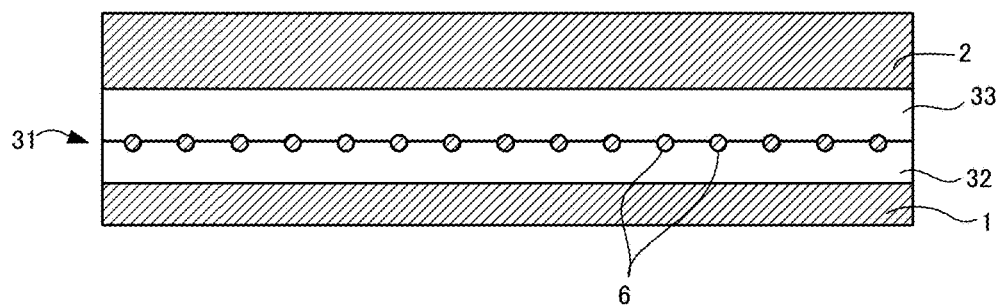
FIG. 7 is a cross-sectional view showing another example of the laminated glass in FIG. 1.

In the above embodiment, the intermediate layer 3 is constituted by a total of three layers, which are the heat-generating layer 31 and the pair of adhesion layers 32 and 33. However, this may not necessarily be the case. That is to say, the intermediate layer 3 need only include at least the bus bars 312 and 313 and the heating line 6. For example, as shown in FIG. 6, the heating lines 6 can also be arranged on the surface of the base 311 on the outer glass plate 1 side. Alternatively, as shown in FIG. 7, a configuration may be employed in which the base 311 is not provided in the heat-generating layer 31, and the heating lines 6 are arranged between the adhesion layers 32 and 33.

5.3

The heat-generating layer 31 can be formed into any of a variety of shapes. For example, a sheet-shaped heat-generating layer 31 in which the bus bars 312 and 313 and the heating lines 6 are formed can be prepared on the base 311, in advance, and this heat-generating layer 31 can be cut off as appropriate into an appropriate shape and arranged between the glass plates 1 and 2. Accordingly, for example, if the end edges of the glass plates 1 and 2 are curved, end edges of the base 311 may also be curved in accordance therewith. The shape of the heat-generating layer 31 does not need to be completely matched with the shape of the glass plates 1 and 2. Since the heat-generating layer 31 can be arranged only in a portion where the defogging effect is to be achieved, the heat-generating layer 31 can be formed into any of various shapes, e.g. a shape with a size smaller than that of the glass plates 1 and 2. Note that the glass plates 1 and 2 can also be formed into any of various shapes other than a completely rectangular shape.

In the above embodiment, the bus bars 312 and 313 and the heating lines 6 are arranged on the base 311. However, at least the heating lines 6 need only be arranged on the base 311. Accordingly, for example, the bus bars 312 and 313 can also be arranged between the adhesion layers 32 and 33.

5.4-1

The configuration of the heating lines 6 is not particularly limited, and various modes are possible. This point will be described with reference to FIG. 8. Since the example in FIG. 8 differs from the above embodiment mainly in the arrangement of the bus bars and the heating lines, only the differences will be described below, and the same configurations are given the same reference numerals and not described.

Figure 8:
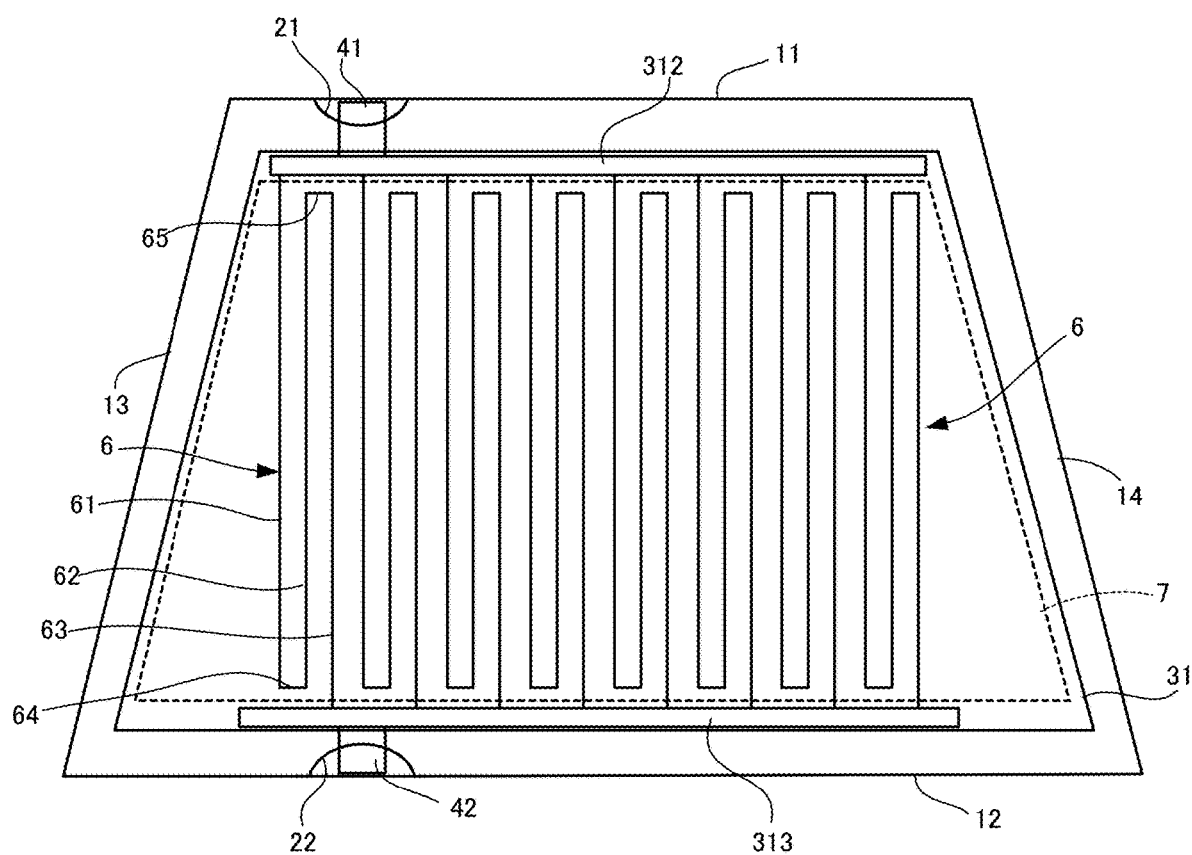
FIG. 8 is a front elevational view showing another example of the laminated glass in FIG. 1

As shown in FIG. 8, in this example, the plurality of heating lines 6 are arranged parallel to each other so as to connect the bus bars 312 and 313 to each other. Each heating line 6 is constituted by three parts and two fold-back portions. That is to say, each heating line 6 is provided with a first part 61, which extends from the first bus bar 312 to a position close to the second bus bar 313, a second part 62, which extends upward from a lower end portion of the first part 61 via a first fold-back portion 64 and then extends to a position close to the first bus bar 312, and a third part 63, which extends downward from an upper end portion of the second part 62 via a second fold-back portion 65 and is then connected to the second bus bar 313. The plurality of heating lines 6, each of which is thus formed, are arranged with a predetermined gap therebetween in the left-right direction of the bus bars 312 and 313.

In the above example, each heating line 6 can be lengthened by providing each heating line with the fold-back portions 64 and 65. This configuration can reduce the amount of heat generated from each heating line 6.

Note that the mode of the heating lines 6 is not particularly limited. Although, in this embodiment, each heating line 6 is formed to have two fold-back portions 64 and 65, three or more fold-back portions may be provided to further increase the length of each heating line 6 that extends between the bus bars 212 and 213.

5.4-2

Figure 9:
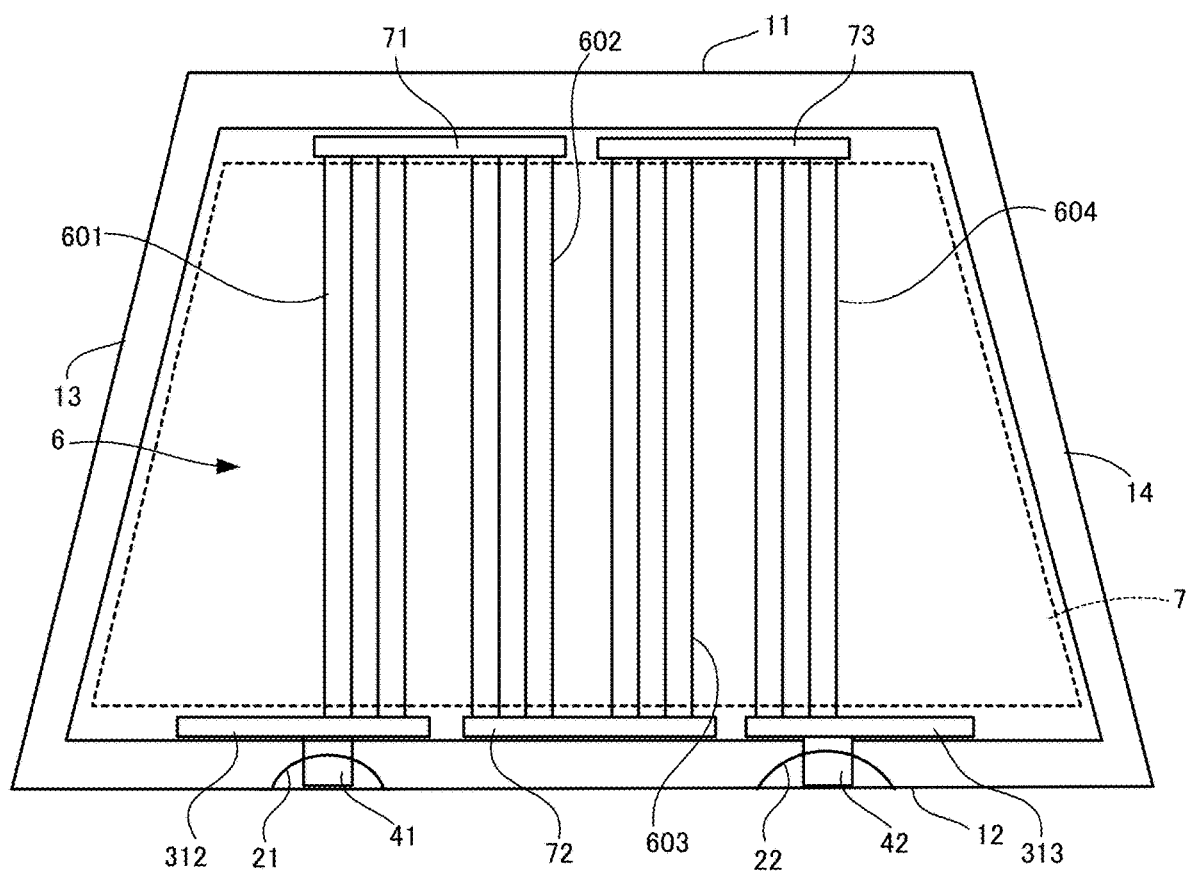
FIG. 9 is a front elevational view showing another example of the laminated glass in FIG. 1

To lengthen each heating line 6, relay bus bars, such as those shown in FIG. 9, can also be provided. This point will be described in detail.

As shown in FIG. 9, in this windshield, the first bus bar 312 is arranged on the left side of the lower sides 12 of the glass plates 1 and 2, and the second bus bar 313 is arranged along the right side of the lower sides 12. In addition, a band-shaped first relay bus bar 71 is provided on the left side of the upper sides 11 of the glass plates 1 and 2, a band-shaped second relay bus bar 72 is provided on the lower sides 12 between the first and second bus bars 312 and 313, and a band-shaped third relay bus bar 73 is provided is provided on the right side of the upper sides 11 of the glass plates 1 and 2. The first relay bus bar 71 is arranged at a position opposing the first bus bar 312 and the second relay bus bar 72, and is formed to have substantially the same length as the length from the left end portion of the first bus bar 312 to a portion near the center of the second relay bus bar 72. The third relay bus bar 73 is arranged at a position opposing the second relay bus bar 72 and the second bus bar 313, and is formed to have substantially the same length as the length from the left end portion of the first bus bar 312 to a portion near the center of the second relay bus bar 72.

The plurality of heating lines 6 are constituted by four parts. That is to say, the plurality of heating lines 6 constituted by first parts 601 that connect the first bus bar 312 and the first relay bus bar 71 to each other, second parts 602 that connect the first relay bus bar 71 and the second relay bus bar 72 to each other, third parts 603 that connect the second relay bus bar 72 and the third relay bus bar 73 to each other, and fourth parts 604 that connect the third relay bus bar 73 and the second bus bar 313 to each other. The plurality of first parts 601 extend substantially parallel to each other, upward from the first bus bar 312, and are connected to the left half of the first relay bus bar 71. The plurality of second parts 602 extend substantially parallel to each other, downward from the right half of the first relay bus bar 71, and are connected to the left half of the second relay bus bar 72. The plurality of third parts 603 extend substantially parallel to each other, upward from the left half of the second relay bus bar 72, and are connected to the third relay bus bar 73. The plurality of fourth parts 604 extend parallel to each other, downward from the right half of the third relay bus bar 73, and are connected to the second bus bar 213.

In the above example, three relay bus bars 71 to 73 are provided between the first bus bar 312 and the second bus bar 313, and the plurality of heating lines 6 arranged parallel to each other via these relay bus bars 71 to 73 connect the first bus bar 312 and the second bus bar 313 to each other. Accordingly, the length of the heating lines 6 between the first bus bar 312 and the second bus bar 313 can be increased. This configuration can reduce the amount of heat generated from each heating line 6.

Although, in this example, the bus bars 312 and 313 are arranged along the lower sides 12, the bus bars 312 and 313 can alternatively be arranged along the upper sides 11. That is to say, the bus bars 312 and 313 and the three relay bus bars 71 to 73 can be arranged at positions vertically opposite to their positions in FIG. 9. The number of relay bus bars is not particularly limited, and two, or four or more relay bus bars may be provided. Two end portions of each heating line need only be connected to the first bus bar 312 and the second bus bar 313 while passing through all of the relay bus bars.

5.5

In this embodiment, heat is applied to the windshield by the heating lines to melt ice or the like, but ice can also be melted by the bus bars. This point will be described with reference to FIG. 10.

Figure 10:
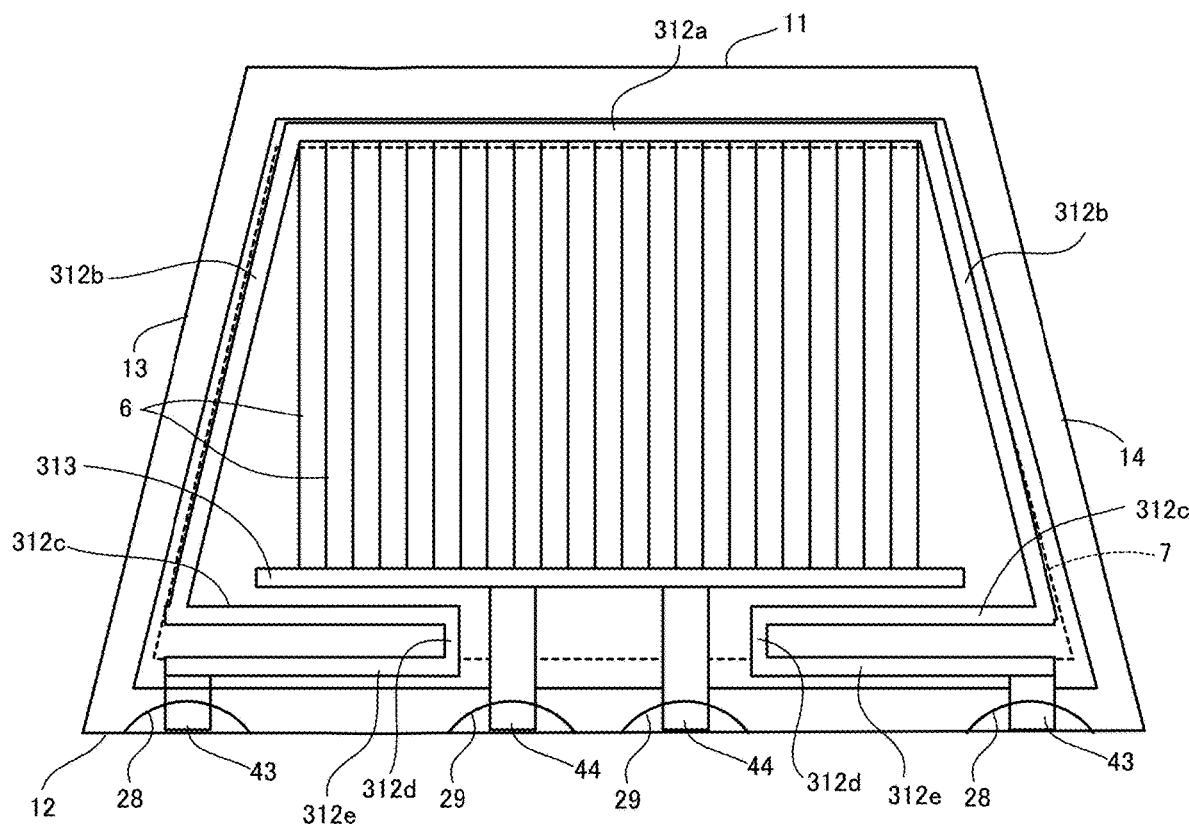
FIG. 10 is a front elevational view showing another example of the laminated glass in FIG. 1.

As shown in FIG. 10, in this example, the first bus bar is elongated. That is to say, the first bus bar 312 includes a first part 312a, which is linear along the upper sides 11, a pair of second parts 312b, which are formed linearly and extend from two end portions of the first part 312a, third parts 312c, fourth parts 312d, and fifth parts 312e. The second parts 312b extend from the end portions of the first part 312a along sides 13 and 14 of the glass plates 1 and 2 to portions near the lower sides 12. Then, the third parts 312c extend in the horizontal direction from lower end portions of the respective second parts 312b toward the center of the glass plates 1 and 2. The fourth parts 312d, which extend downward, are connected to the end portions of the respective third parts 312c, and the fifth parts 312e, which horizontally extend to portions near the sides 13 and 14, are connected to the lower end portions of the respective fourth parts 312d.

Meanwhile, the second bus bar 313 is arranged above the third parts 312c of the first bus bar, and the plurality of heating lines 6 are arranged between the first part 312a of the first bus bar 312 and the second bus bar 313.

Connecting materials 43 are attached to two end portions of the first bus bar, i.e. end portions of the fifth parts, and extend to the lower side of the inner glass plate. These connecting materials 43 are exposed from cutout portions 28, which are formed in the inner glass plate 2. Meanwhile, a pair of connecting materials 44, which are arranged with a predetermined gap therebetween, are attached to the second bus bar 313, and these connecting materials 44 extend from portions between the fourth parts 312d of the first bus bar 312 to the lower side 12 of the inner glass plate 2. These connecting materials 44 are exposed from cutout portions 29, which are formed in the inner glass plate 2. If a voltage is applied between the connecting materials 43 and the connecting materials 44, heat is generated from the heating lines 6, and is also generated from the bus bar 312 and 313, making it possible to melt ice or the like. In addition, due to the bus bars 312 and 313 generating heat, the amount of heat generated per unit length of each heating line 6 can be suppressed. As a result, the aforementioned flicker can be prevented.

The above-described bus bars 312 and 313 can be formed to be 10 mm or less, for example, and thus, the bus bars 312 and 313 can also be heated to melt ice or the like on the glass plate. In particular, since the first bus bar 312 is formed to extend along the periphery of the glass plates 1 and 2, ice or the like can also be melted at the periphery of the glass plates 1 and 2 where heat from the heating lines 6 is unlikely to reach. Also, due to the bus bars 312 and 313 that extend along the peripheral edges of the glass plates 1 and 2 generating heat, the amount of heat generated per unit length of each heating line 6 can be suppressed. As a result, the aforementioned flicker can be prevented. Note that the bus bars 312 and 313, which have a larger width than the width of each heating line 6, are arranged on the peripheral edges of the glass plates 1 and 2 so as to not interrupt a driver's field of view. If the width of each of the bus bars 312 and 313 is varied, for example, the smallest width is regarded as the width of each bus bar.

Note that FIG. 10 shows an example of the bus bars, and the shape thereof is not particularly limited. For example, mainly, the bus bars need only be formed along the peripheral edges of the glass plates, and the length and path thereof is not particularly limited. Also, either one of the first bus bar 312 and the second bus bar 313 may be made longer.

5.6

Adjacent heating lines 6 can also be connected using at least one bypass line. Thus, for example, even if one of the heating lines 6 is broken, electric power can be supplied from the adjacent heating line 6. The position and the number of bypass lines are not particularly limited. The shape of the bypass lines is not particularly limited either. The bypass lines can be arranged so as to extend obliquely, or can be formed into any of a variety of shapes, such as a wave shape. Note that the bypass lines may be formed with the same metallic material as that of the heating lines 6, and may be integrally formed with the heating lines 6.

5.7

Figure 11:
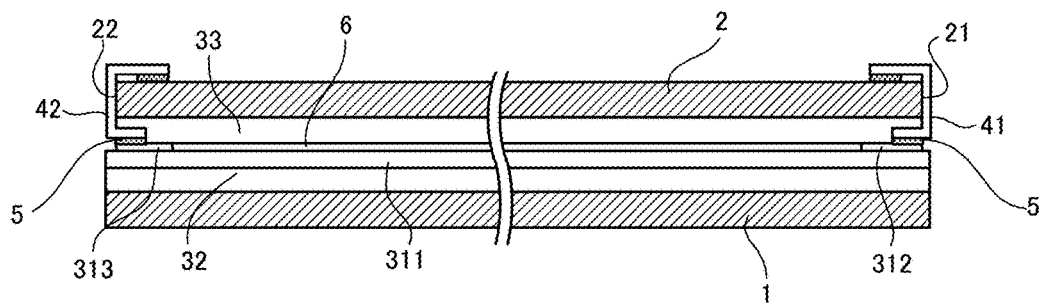
FIG. 11 is a cross-sectional view showing another example of the laminated glass in FIG. 1.

The mode of the connecting members 41 and 42 and the configuration of the cutout portions 21 and 22 of the inner glass plate 2 are not particularly limited either. For example, as shown in FIG. 11, a configuration can also be employed in which small cutout portions 21 and 22 with substantially the same thickness as that of the connecting members 41 and 42 are formed in the inner glass plate 2, and the connecting members 41 and 42 that extend from the respective bus bars 312 and 313 are folded back at these cutout portions 21 and 22, and are stuck to a surface of the inner glass plate 2. This configuration can prevent the connecting members 41 and 42 from protruding in the face direction from the end portions of the laminated glass.

5.8

The shape of the glass plates 1 and 2 is not particularly limited, and need only be a shape with which the upperside 11, the lowerside 12, a leftside 13, and a rightside 14 can be specified on the outer shape thereof. The shape of the glass plates 1 and 2 does not necessarily need to be a rectangular shape. The sides 11 to 14 need not be only straight lines, but may also be curved lines.

5.9

The plurality of heating lines 6 need not be necessarily arranged parallel to each other, and may have an irregular shape, such as mesh, for example. Although, in the above embodiment, the heating lines 6 are connected in parallel with the bus bars 312 and 313 serving as electrodes, the heating lines 6 may alternatively be connected in series. It is also possible to arrange heating lines 6 that are folded more than once between bus bars 312 and 313.

5.10

Although, in this embodiment, the bus bars 312 and 313 are arranged along the upper sides and the lower sides, respectively, of the glass plates, the bus bars may alternatively be arranged along the left sides and the right sides of the glass plates such that the heating lines extend in the left-right direction.

5.11

Although the above embodiment has described an example in which the laminated glass of the present invention is applied to a windshield of an automobile, the laminated glass of the present invention is also applicable to side glass and rear glass. Also, the laminated glass of the present invention is not only applicable to a windshield of an automobile, and is also applicable to window glass of other forms of transportation, such as a train, or of a building.

EXAMPLES

Examples of the present invention will be described below. However, the present invention is not limited to the following examples.

1. Examination of Relationship Between Heating Line Pitch and Flicker

First, the relationship between the heating line pitch and flicker will be examined. The amount of heat generated and the like were set similarly to those in the aforementioned Table 2 (with a voltage of 13.5 V). Items not shown in Table 2, such as a heat-generating region, are also as mentioned above. The heating lines in windshields in Examples 1 to 6 were set as follows.

TABLE 8

|  | Example 1 | Example 2 | Example 3 | Example 4 | Example 5 | Example 6 |
|---|---|---|---|---|---|---|
| Heating line pitch (mm) | 1.5 | 2.0 | 2.5 | 3.0 | 3.5 | 4.0 |
| Number of heating lines (lines) | 787 | 590 | 472 | 393 | 337 | 295 |
| Heating line resistance ($\Omega$) | 254 | 190 | 152 | 127 | 109 | 95 |
| Heating line current (A) | 0.05 | 0.07 | 0.09 | 0.11 | 0.12 | 0.14 |
| Heating line power (W) | 0.72 | 0.96 | 1.20 | 1.44 | 1.68 | 1.92 |
| Heating line amount of heat generated per length (W/m) | 0.63 | 0.83 | 1.04 | 1.25 | 1.46 | 1.67 |

Figure 12:
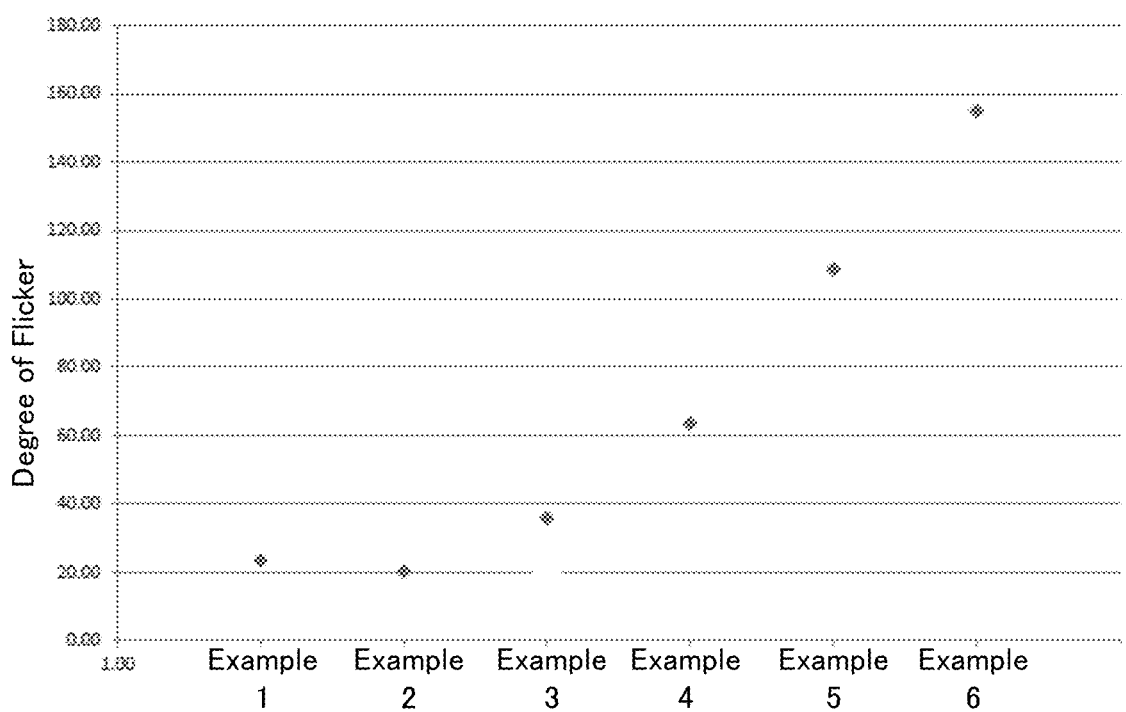
FIG. 12 is a graph illustrating the degree of flicker in a steady state in Examples 1 to 6 of the present invention.

The degree of flicker in a steady state was calculated as shown in FIG. 12. Thus, it was understood that, if the amount of heat generated per unit area of the heat-generating region (windshield) is fixed, the larger the amount of heat generated per unit length of each heating line, the greater the degree of flicker. Note that the degree of flicker is a value that represents flicker, but is an example that represents flicker, and it is considered that similar results will be obtained if other indexes are used.

Figure 13:
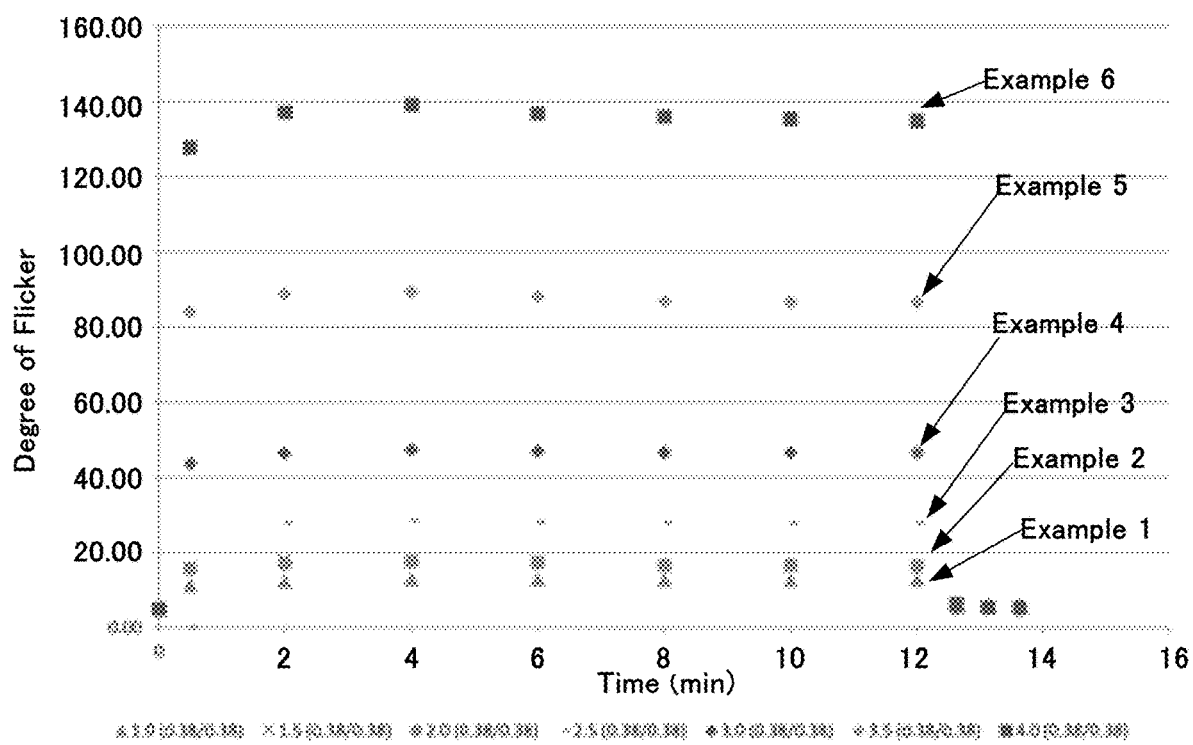
FIG. 13 is a graph illustrating a time-series change in the degree of flicker in a non-steady state in Examples 1 to 6 of the present invention.

In Examples 1 to 6, the degree of flicker in a non-steady state was calculated. That is, the relationship between the lapse of time and the degree of flicker was calculated as shown in FIG. 13. As shown in FIG. 13, it was understood that the degree of flicker does not significantly change over time.

2. Examination of Flicker that Actually Occurs

Next, actual flicker will be examined. First, windshields in Comparative Examples 1 and 2 were prepared as follows. The other conditions in Comparative Examples 1 and 2 are the same as those in Examples 1 to 6.

TABLE 9

|  | Comparative Example 1 | Comparative Example 2 |
|---|---|---|
| Heating line pitch (mm) | 5.0 | 6.0 |
| Number of heating lines (lines) | 236 | 197 |
| Heating line resistance ($\Omega$) | 76 | 63 |
| Heating line current (A) | 0.18 | 0.21 |
| Heating line power (W) | 2.40 | 2.87 |
| Heating line amount of heat generated per length (W/m) | 2.08 | 2.50 |

Next, examination was conducted regarding flicker occurring when an image of a test indicator was captured using a digital camera through the windshields in the aforementioned Examples 2 and 4 and Comparative Examples 1 and 2. The distance from the windshields in Examples and Comparative Examples to the test indicator was 7 m, and the distance from the digital camera to the windshields was 0.6 m. An image of the test indicator was captured by the digital camera before the windshields were energized, and 5 seconds after the energization. The results are as shown in FIGS. 14 to 17. Also, the change rate of the diameter of circular light in the equipment for secondary image test was measured before energization and 5 seconds after the energization, and the results were as follows.

TABLE 10

Figure 14:
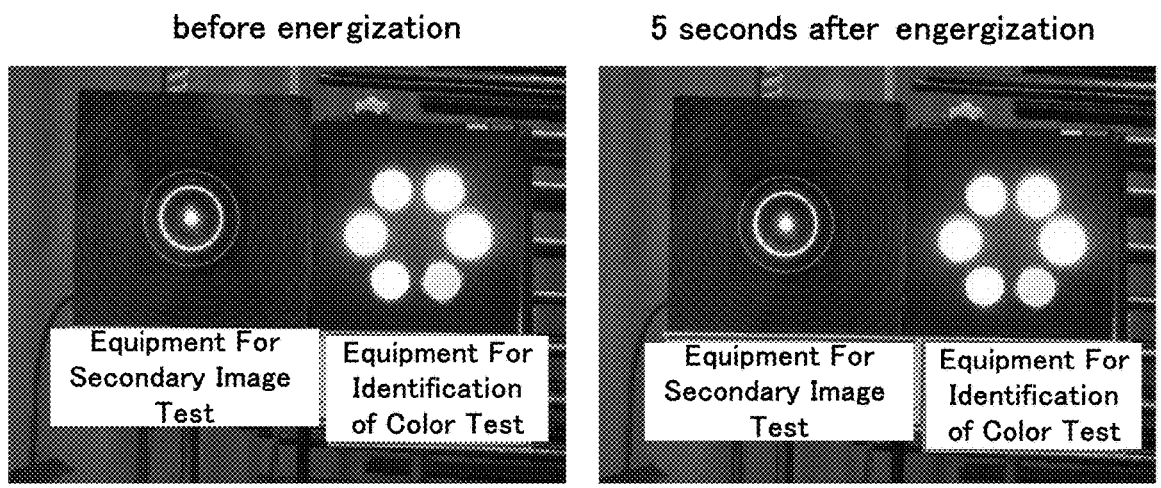
FIG. 14 shows the results of a flicker test using a windshield in Example 2 of the present invention.
Figure 15:
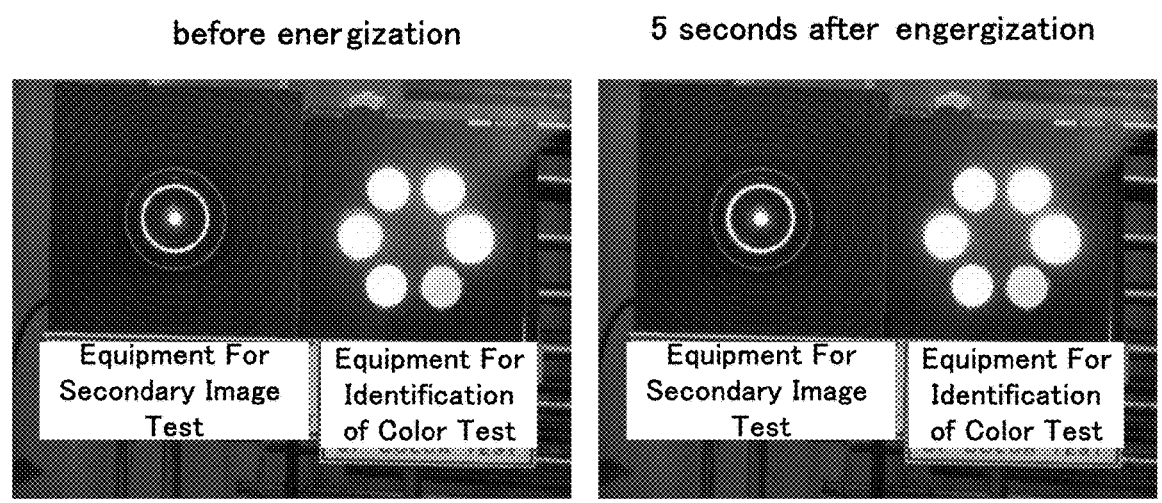
FIG. 15 shows the results of a flicker test using a windshield in Example 4 of the present invention.
Figure 16:
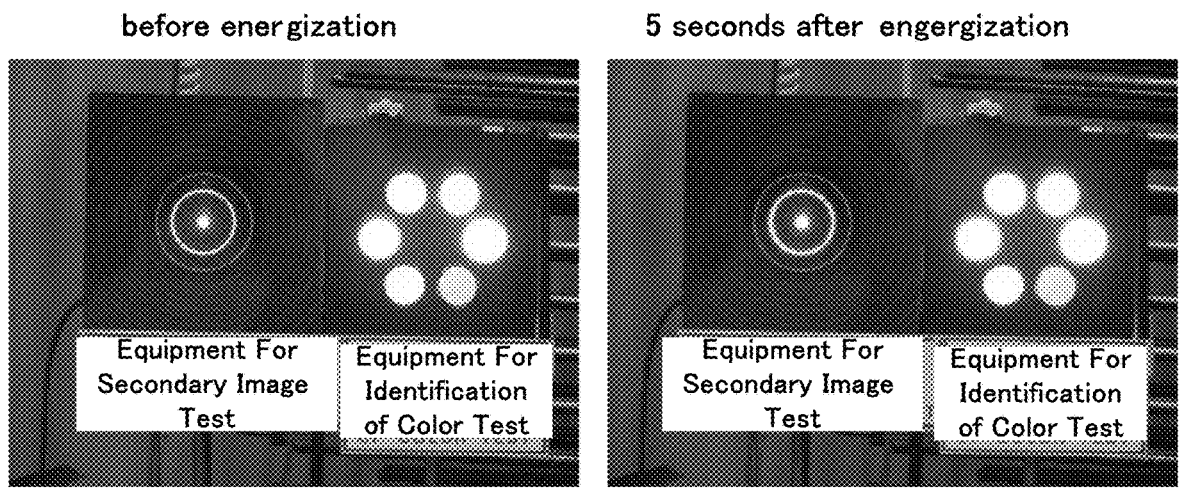
FIG. 16 shows the results of a flicker test using a windshield in Comparative Example 1.
Figure 17:
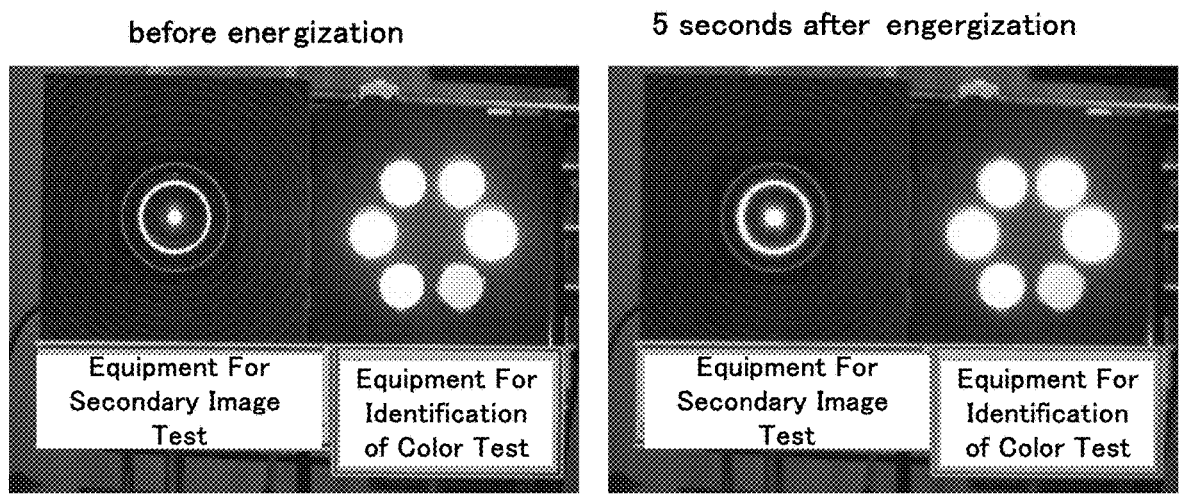
FIG. 17 shows the results of a flicker test using a windshield in Comparative Example 2.

| | Change rate | Shot Picture |
|---|---|---|
| Example 2 | 0% | FIG. 14 |
| Example 4 | 9% | FIG. 15 |
| Comparative Example 1 | 20% | FIG. 16 |
| Comparative Example 2 | 33% | FIG. 17 |

As shown in FIGS. 14 to 17 and Table 10, in Examples 2 and 4, the diameter of the circular light hardly changed after the energization. That is to say, it can be understood that flicker is suppressed. In contrast, in Comparative Examples 1 and 2, the diameter of the circular light after the energization increased, and it can be understood that flicker occurred in a visually recognizable manner. Accordingly, it was understood that flicker is suppressed if the amount of heat generated per unit length of each heating line is 2.0 W/m or less.

3. Examination Regarding Temperature of Heating Lines and Therearound

Figure 18:
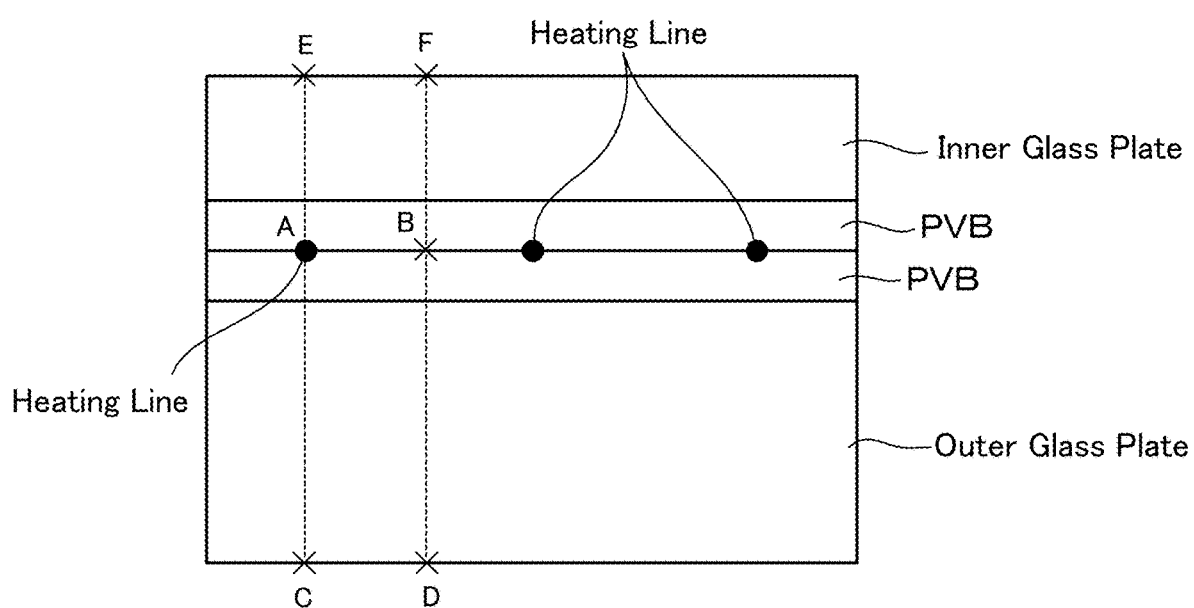
FIG. 18 is a model of a windshield used in the simulation in Examples 7 to 12 and Comparative Example 3.

Next, Examples 7 and 8 and Comparative Example 3 were prepared, and a simulation of the change in the temperature of the heating lines and therearound was carried out. Abaqus 6.13-5, manufactured by SIMULIA, was used as simulation software, and a model with a cross-section shown in FIG. 18 was used. As shown in FIG. 18, a windshield was prepared in which an intermediate film, which was obtained by stacking two PVB sheets with a thickness of 0.38 mm, was sandwiched between an inner glass plate with a thickness of 1.0 mm and an outer glass plate with a thicknesses of 2.0 mm. Otherwise, heating lines were arranged between two PVB sheets. Physical property values used in the simulation were as follows. Note that the simulation was conducted while arranging the above-described heating lines, unless otherwise stated.

TABLE 11

| | Conductivity | Heat conductivity | Specific heat | Specific gravity | Thermal emissivity |
|---|---|---|---|---|---|
| | Ωm | W/mK | KJ/kg – K | — | — |
| Heating line | 1.80E−08 | 401 | 0.385 | 8.9 | — |
| Glass plate | — | 1.0 | 0.753 | 2.5 | 0.86 |
| PVB | — | 0.2 | 1.9 | 1.07 | — |

Boundary conditions used in the simulation were set as follows, while referencing values for winter season under JIS R 3106.

TABLE 12

| Temperature (° C.) | Indoor surface heat conductivity (W/m² – K) | Outdoor surface heat conductivity (W/m² – K) |
|---|---|---|
| −18 | 3.3 | 16.3 |

The following conditions were set for Examples 7 and 8 and Comparative Example 3. Table 13 shows conditions common to these examples and the comparative example, and Table 14 shows conditions unique to each of these examples and the comparative example.

TABLE 13

| Amount of heat generated (W/m²) | 600 |
|---|---|
| Voltage (V) | 2.29 |
| Heat-generating region width (mm) | 90 |
| Heat-generating region height (mm) | 182 |
| Heat-generating region area (m²) | 0.016 |
| Power (W) | 10 |
| Total resistance (Ω) | 0.53 |
| Heating line thickness (μm) | 12 |
| Conductivity (Ω·m) | 1.80.E−08 |
| Crimp (%) | 121% |
| Heating line length (m) | 0.22 |

TABLE 14

| | Example 7 | Example 8 | Comparative Example 3 |
|---|---|---|---|
| Pitch (mm) | 1.4 | 2.8 | 4.2 |
| Number (lines) | 64 | 32 | 21 |
| Resistance (Ω) | 34 | 17 | 11 |
| Current (A) | 0.07 | 0.13 | 0.2 |
| Power (W) | 0.15 | 0.31 | 0.46 |
| Amount of heat generated per length (W/m) | 0.69 | 1.39 | 2.08 |
| Cross-sectional area (m²) | 1.16.E−10 | 2.31.E−10 | 3.47.E−10 |
| Lower side width (μm) | 9.1 | 18.8 | 28.4 |
| Upper side width (μm) | 10.1 | 19.8 | 29.4 |

The results are as follows. First, with the laminated glass in Examples 7 and 8 and Comparative Example 3, the difference between the temperature of a heating line (point A) and the temperature between heating lines (point B) in FIG. 18 was calculated. At this time, in the simulation, analysis in a steady state was conducted. The results are as follows.

Example 7: 3.096° C.

Example 8: 6.626° C.

Comparative Example 3: 10.190° C.

Accordingly, it was understood that the wider the pitch between the heating lines, the greater the difference in the temperature between the heating line and the PVB between adjacent heating lines. As mentioned above, flicker occurs if the temperature of the heating lines exceeds about 60 degrees, and, in addition, it is also conceivable that the degree of flicker also increases due to the temperature difference within the intermediate film becoming 10° C. or greater, as in Comparative Example 3.

Next, with the laminated glass in Examples 7 and 8 and Comparative Example 3, a time-series temperature change at the respective points in FIG. 18 was calculated. At this time, in the simulation, analysis in a steady state was conducted.

Figure 19:
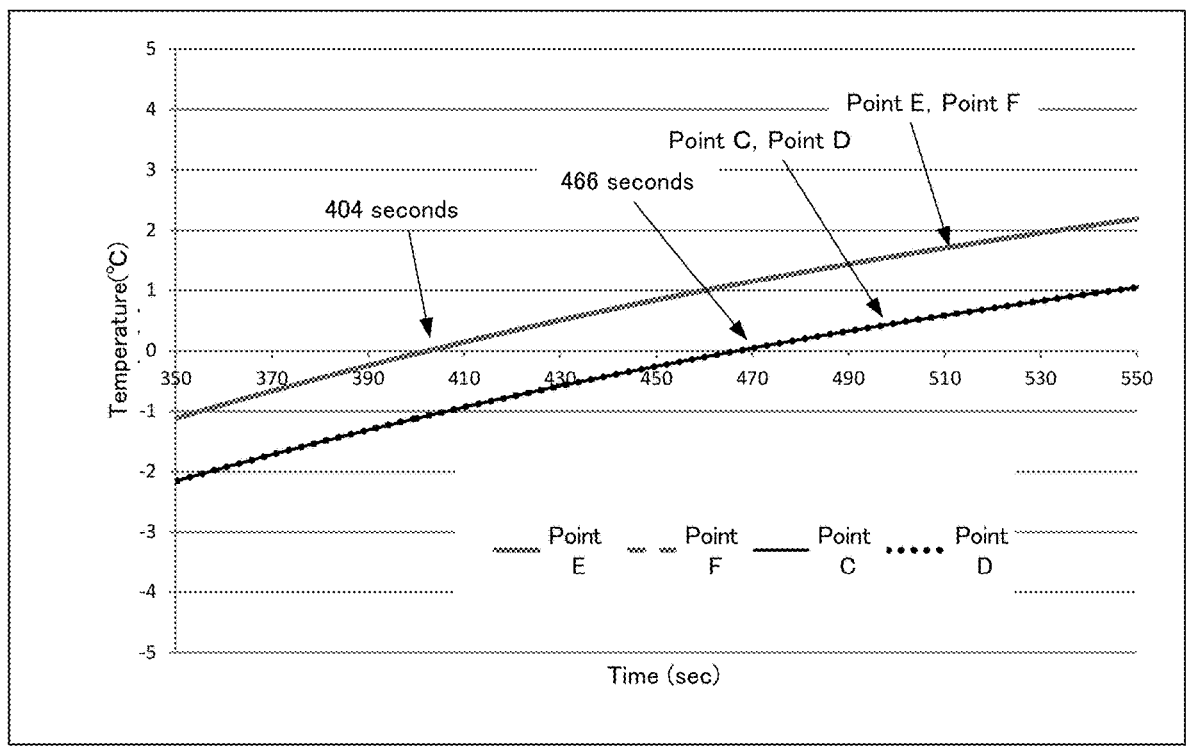
FIG. 19 is a graph illustrating a time-series change in surface temperature of a windshield in Example 7.
Figure 20:
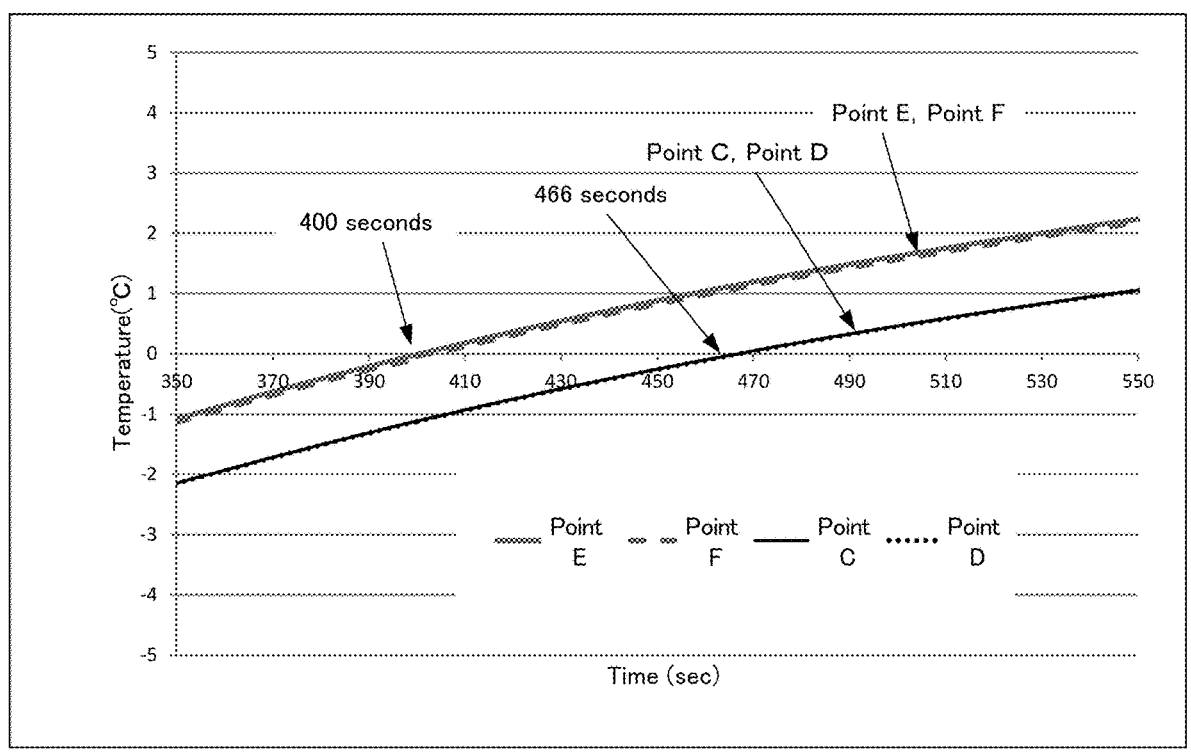
FIG. 20 is a graph illustrating a time-series change in surface temperature of a windshield in Example 8.
Figure 21:
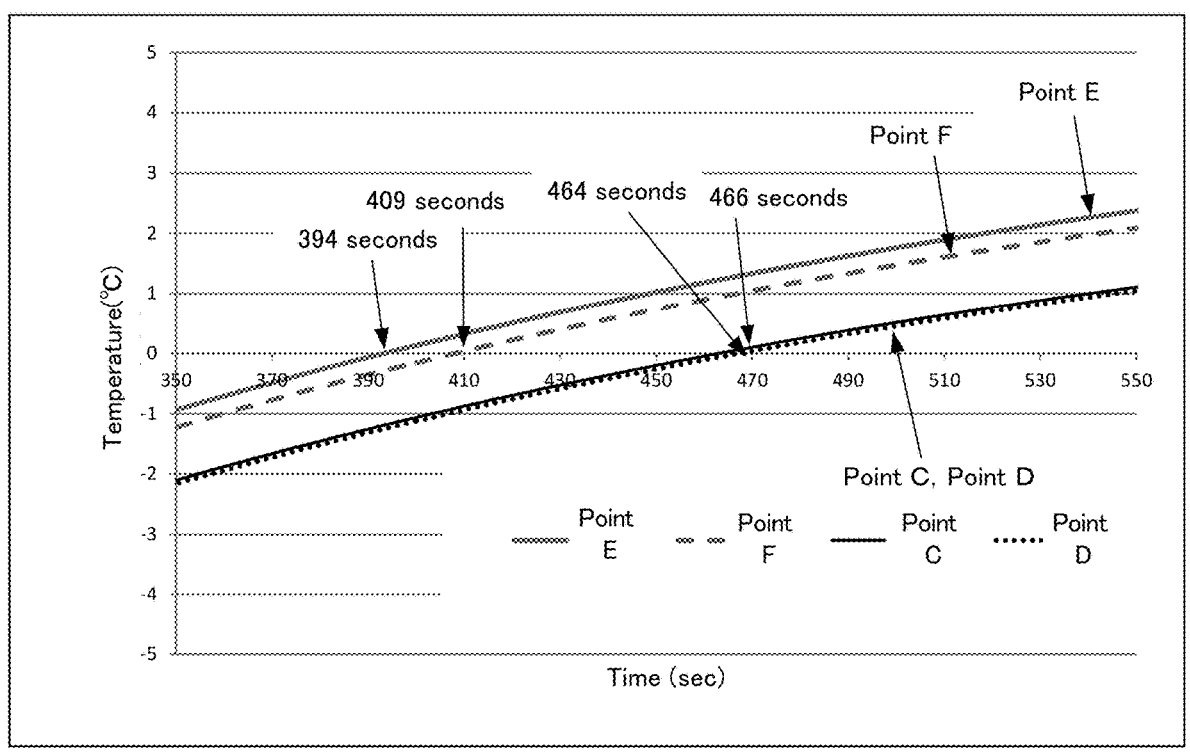
FIG. 21 is a graph illustrating a time-series change in surface temperature of a windshield in Comparative Example 3.
Figure 22:
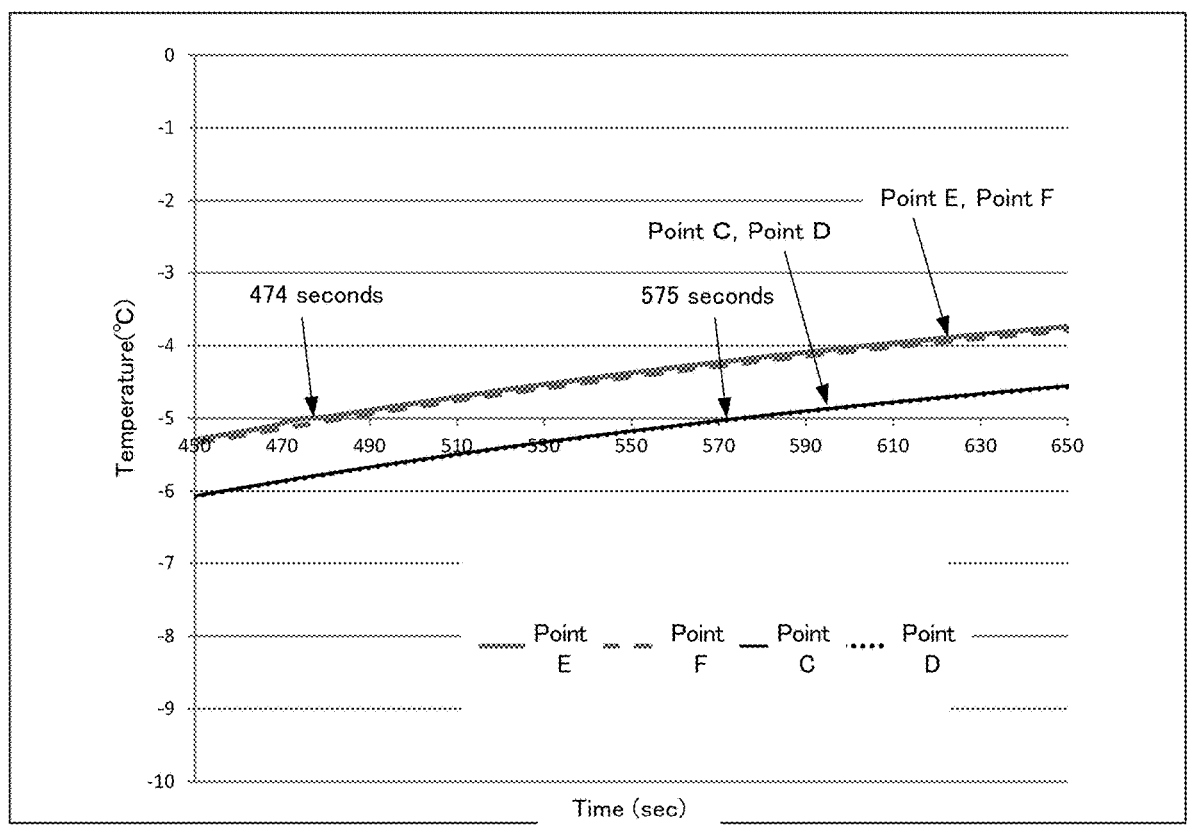
FIG. 22 is a graph illustrating a time-series change in surface temperature of a windshield in Example 9.
Figure 23:
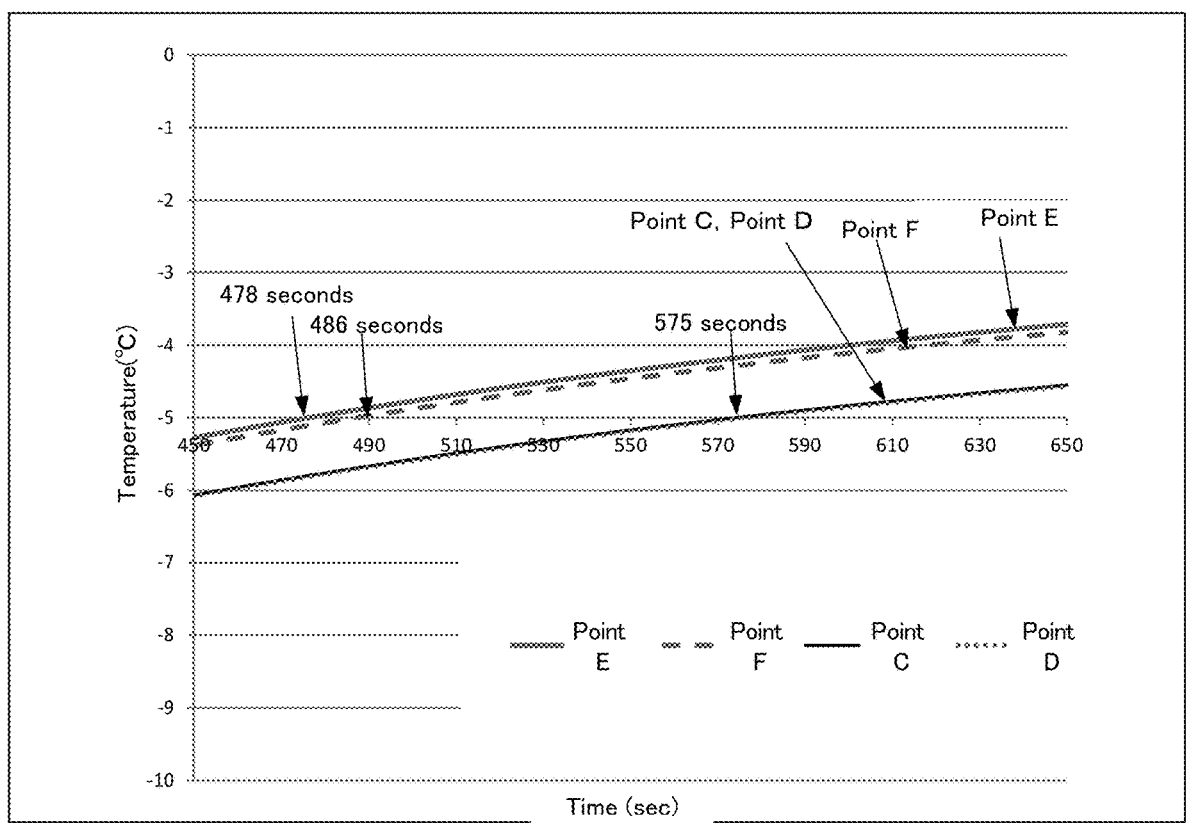
FIG. 23 is a graph illustrating a time-series change in surface temperature of a windshield in Example 10.
Figure 24:
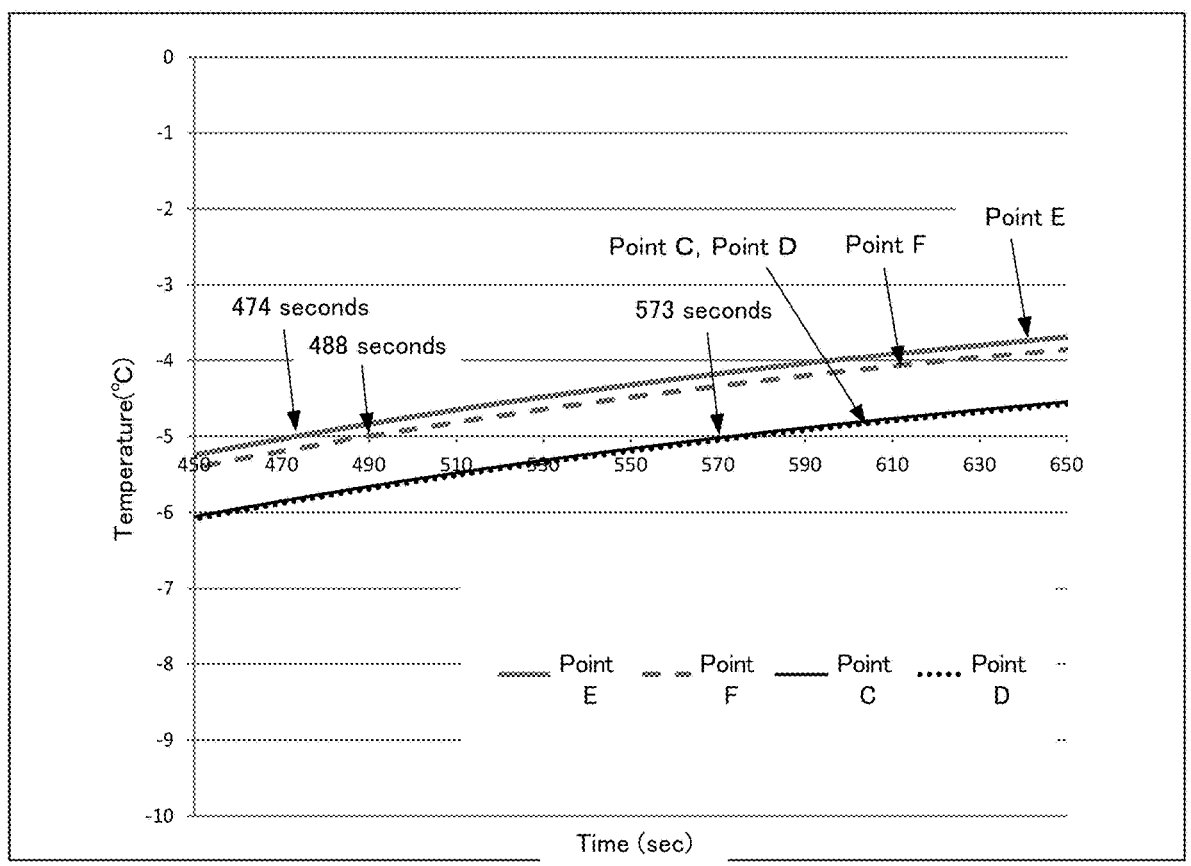
FIG. 24 is a graph illustrating a time-series change in surface temperature of a windshield in Example 11.
Figure 25:
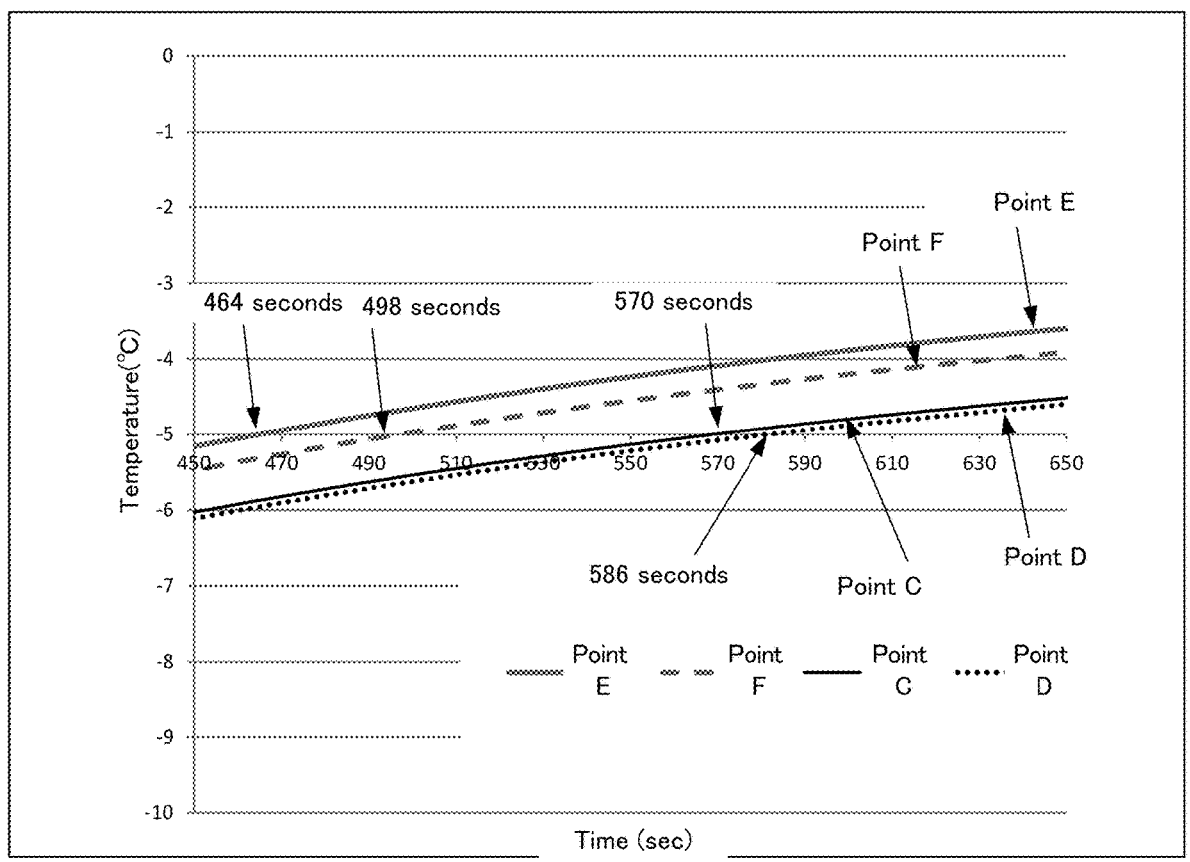
FIG. 25 is a graph illustrating a time-series change in surface temperature of a windshield in Example 12.

Point C: a point corresponding to a heating line on the surface of the outer glass plate Point D: a point corresponding to a middle point between adjacent heating lines on the surface of the outer glass plate Point E: a point corresponding to a heating line on the surface of the inner glass plate Point F: a point corresponding to a middle point between adjacent heating lines on the surface of the inner glass plate The results are as shown in FIGS. 19 to 21. The numbers of seconds in the graphs indicate the time required for the temperature to increase from −18° C. to 0° C. FIG. 19 illustrates Example 7, and there was no difference in the temperature change between the point C and the point D. Similarly, there was no difference in the temperature change between the point E and the point F. It is conceivable that a difference occurred between the point C and the point D and between the point E and the point F due to the thickness of the glass plates. Results similar to those in Example 7 were also obtained in Example 8 in which the pitch between the heating lines was wider. That is to say, as shown in FIG. 20, there was no difference in the temperature change between the point C and the point D, and there was no difference in the temperature change between the point E and the point F either.

In contrast, in Comparative Example 3, a difference occurred in the temperature change between the point E and the point F, as shown in FIG. 21. That is to say, the time required for the temperature to increase from −18° C. to 0° C. at the point E was 394 seconds, whereas the time required for the temperature to increase from −18° C. to 0° C. at the point F was 409 seconds. Accordingly, since there is a difference in the increase in the temperature, there is concern that ice and fog will be removed unevenly. That is to say, in the windshield, fog is quickly removed in areas corresponding to the heating lines, but the defogging is belated in areas corresponding to portions in the middle between the heating lines.

Whereas the amount of heat generated from each heating line was 600 W/m2 in Examples 7 and 8 and Comparative Example 3 above, a similar simulation was conducted while setting the amount of heat generated to 400 W/m2. The following conditions were set below in Examples 9 to 12. Table 15 shows conditions common to these examples and comparative example, and Table 16 shows conditions unique to each of these examples and comparative example. Note that conditions other than these conditions, such as the model in FIG. 18, for example, were the same as those in Examples 7 and 8 and Comparative Example 3.

TABLE 15

| Amount of heat generated (W/m2) | 400 |
| Voltage (V) | 2.76 |
| Heat-generating region width (mm) | 90 |
| Heat-generating region height (mm) | 182 |
| Heat-generating region area (m2) | 0.016 |
| Power (W) | 6.6 |
| Total resistance (Ω) | 1.16 |
| Heating line thickness (μm) | 12 |
| Conductivity (Ω·m) | 1.80.E−08 |
| Crimp (%) | 121% |
| Heating line length (m) | 0.22 |

TABLE 16

|  | Example 9 | Example 10 | Comparative Example 11 | Comparative Example 12 |
| --- | --- | --- | --- | --- |
| Pitch (mm) | 3 | 3.5 | 4 | 5 |
| Number (lines) | 30 | 26 | 23 | 18 |
| Resistance (Ω) | 35 | 30 | 26 | 21 |
| Current (A) | 0.08 | 0.09 | 0.11 | 0.13 |
| Power (W) | 0.22 | 0.25 | 0.29 | 0.36 |
| Amount of heat generated per length (W/m) | 0.99 | 1.16 | 1.32 | 1.65 |
| Cross-sectional area (m$^2$) | 1.14E−10 | 1.33E−10 | 1.52E−10 | 1.90E−10 |
| Lower side width (μm) | 10 | 11.6 | 13.2 | 16.3 |
| Upper side width (μm) | 9 | 10.6 | 12.2 | 15.3 |

The results are as follows. First, with the laminated glass in Examples 9 to 12, the difference between the temperature of a heating line (point A) and the temperature between the heating lines (point B) in FIG. 18 was calculated. At this time, in the simulation, analysis in a steady state was conducted. The results are as follows.

Example 9: 5.321° C.

Example 10: 5.614° C.

Example 11: 6.646° C.

Example 12: 8.183° C.

Accordingly, it was understood that the wider the pitch between the heating lines, the greater the difference in the temperature between the heating line and the PVB between adjacent heating lines.

Next, with the laminated glass in Examples 9 to 12, the time-series temperature change at the respective points in FIG. 18 was calculated similarly to Example 7 etc. above.

The results are as shown in FIGS. 22 to 25. FIGS. 22 to 25 show Examples 9 to 12, respectively. The numbers of seconds in the graphs indicate time required for the temperature to increase from −18° C. to −5° C. As shown in these graphs, it was understood that the greater the pitch between the heating lines is, a greater difference occurs in the temperature change between the point E and the point F, and more time is required for the temperature to increase at the point F. Comparing Example 9 with Example 12, there was no significant difference in the temperature change at the points C, D, and E, but, as for the point F, it was understood that 474 seconds were required to reach −5° C. in Example 9 (FIG. 22), whereas 498 seconds were required in Example 12 (FIG. 25), and a difference of 20 seconds or more occurred. Accordingly, since there is a difference in the increase in the temperature, there is concern that ice and fog will be removed unevenly. That is to say, it was understood that, in the windshield, fog is quickly removed in areas corresponding to the heating lines, but the defogging is belated in areas corresponding to portions in the middle between the heating lines.

4. Examination Regarding Heating Line Position and Temperature Therearound

The windshields in Reference Examples 1 and 2 were prepared using a single heating line, as follows. The windshields in both Reference Examples 1 and 2 have the following configuration.

Inner glass plate: thickness 2.1 mm, heat conductivity 1 W/(m·K)

Heating line: made of copper, outer diameter 25 μm

Intermediate layer (adhesive layer): made of PVB, thickness 0.76 mm

Outer glass plate: thickness 2.1 mm, heat conductivity 1 W/(m·K)

In Reference Example 1, the heating line was arranged so as to come into contact with the inner glass plate, and, in Reference Example 2, the heating line was arranged at the center in the thickness direction of the intermediate layer.

Figure 26:
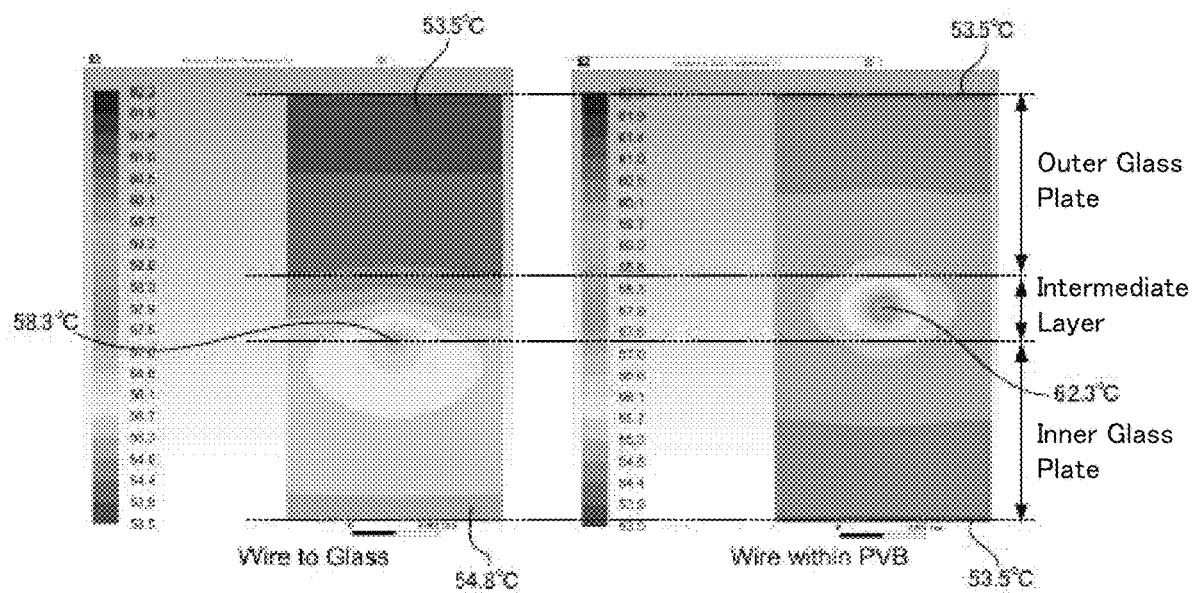
FIG. 26 shows a temperature distribution in a cross-section of windshields in Reference Examples 1 and 2.

Next, Reference Examples 1 and 2 were evaluated as follows. That is to say, a current was applied to the heating line in Reference Examples 1 and 2 above, and the temperature distributions in cross-sections of the laminated glass in Reference Examples 1 and 2 were measured. The results are as shown in FIG. 26. Note that, in FIG. 26, the vertical direction corresponds to the thickness direction of the laminated glass.

As shown in FIG. 26, in Reference Example 2, it can be understood that the temperature in an area around the position where the heating line is arranged is high, namely 62° C. or higher. In contrast, in Reference Example 1, it can be understood that, since the heating line is arranged closer to the inner glass plate, heat from the heating line is released, and the increase in the temperature in the area around the position where the heating line is arranged is suppressed. Thus, it can be understood that the temperature around the heating line decreases if the heating line is brought into contact with the glass plate, whereas the temperature around the heating line increases if the heating line is separated from the glass plate. Although both Reference Examples 1 and 2 are simulations using a single heating line, even in such a mode as that of Reference Example 2, flicker can be prevented by adjusting the amount of heat generated per unit length of each heating line, as in the present invention.

5. Examination of Relationship Between Heating Line Pitch and Flicker with Voltage of 400 V Next, an examination was conducted regarding the relationship between the heating line pitch and flicker when a voltage of 400 V is applied. Here, such window glass with relay bus bars as that shown in FIG. 9 was used, and Examples 13 to 16 and Comparative Example 3 were prepared through simulations. Although the number of relay bus bars in FIG. 9 is three, the number of relay bus bars, the number of heating lines, and so on, were changed as follows in Examples 13 to 16 and Comparative Example 4. However, in Examples 13 to 16 and Comparative Example 3 below, the number of relay bus bars was an odd number, and the first bus bar and the second bus bar were arranged at respective ends of the lower side.

Conditions common to Examples 13 to 16 and Comparative Example 3 are as follows.

TABLE 17

| | |
|---|---:|
| Amount of heat generated (W/m$^2$) | 500 |
| Voltage (V) | 400.0 |
| Heat-generating region width (mm) | 2000 |
| Heat-generating region height (mm) | 2000 |
| Heat-generating region area (m$^2$) | 4.00 |
| Power (W) | 2000 |
| Total resistance (Ω) | 80.00 |
| Heating line thickness (μm) | 12 |
| Conductivity (Ω·m) | 1.80.E−08 |
| Crimp (%) | 120% |
| Length of 1 heating line (m) | 2.4 |

Then, Examples 13 to 16 and Comparative Example 4 were set as follows. Note that, although not all of the heating lines connected to each of the relay bus bars are completely the same, adjustment was made such that substantially the same number of heating lines is connected each relay bus bar.

TABLE 18

| | Example 13 | Example 14 | Example 15 | Example 16 | Comparative Example 4 |
|---|---|---|---|---|---|
| Number of relay bus bars | 15 | 13 | 11 | 9 | 7 |
| Heating line lower side width (μm) | 12.0 | 12.0 | 12.0 | 12.0 | 12.0 |
| Heating line upper side width (μm) | 10.0 | 10.0 | 10.0 | 10.0 | 10.0 |
| Heating line cross-sectional area (m$^2$) | 1.32E−10 | 1.32E−10 | 1.32E−10 | 1.32E−10 | 1.32E−10 |
| Heating line resistance (Ω) | 327 | 327 | 327 | 327 | 327 |

TABLE 18-continued

|  | Example 13 | Example 14 | Example 15 | Example 16 | Comparative Example 4 |
|---|---|---|---|---|---|
| Number of heating lines (lines) | 65 | 57 | 49 | 41 | 33 |
| Heating line pitch (mm) | 1.9 | 2.5 | 3.4 | 4.9 | 7.6 |
| Heating line power (W) | 1.9 | 2.5 | 3.4 | 4.9 | 7.6 |
| Heating line amount of heat generated per length (W/m) | 0.8 | 1.0 | 1.4 | 2.0 | 3.2 |
| Flicker | OK | OK | OK | OK | NG |

As an evaluation of flicker in Table 18, a degree of flicker higher than that in Example 6 was evaluated as NG (no-good), and the degrees of flicker in Examples 1 to 6 were evaluated as OK. As indicated in FIG. 18, the result of evaluating flicker was NG in Comparative Example 4 in which the amount of heat generated per length of the heating line exceeded 2.0 W/m. Note that, although the amount of heat generated per length (W/m) in Example 16 was larger than that in Example 6, the degree of flicker in Example 16 was equivalent to that in Example 6.

Figure 27:
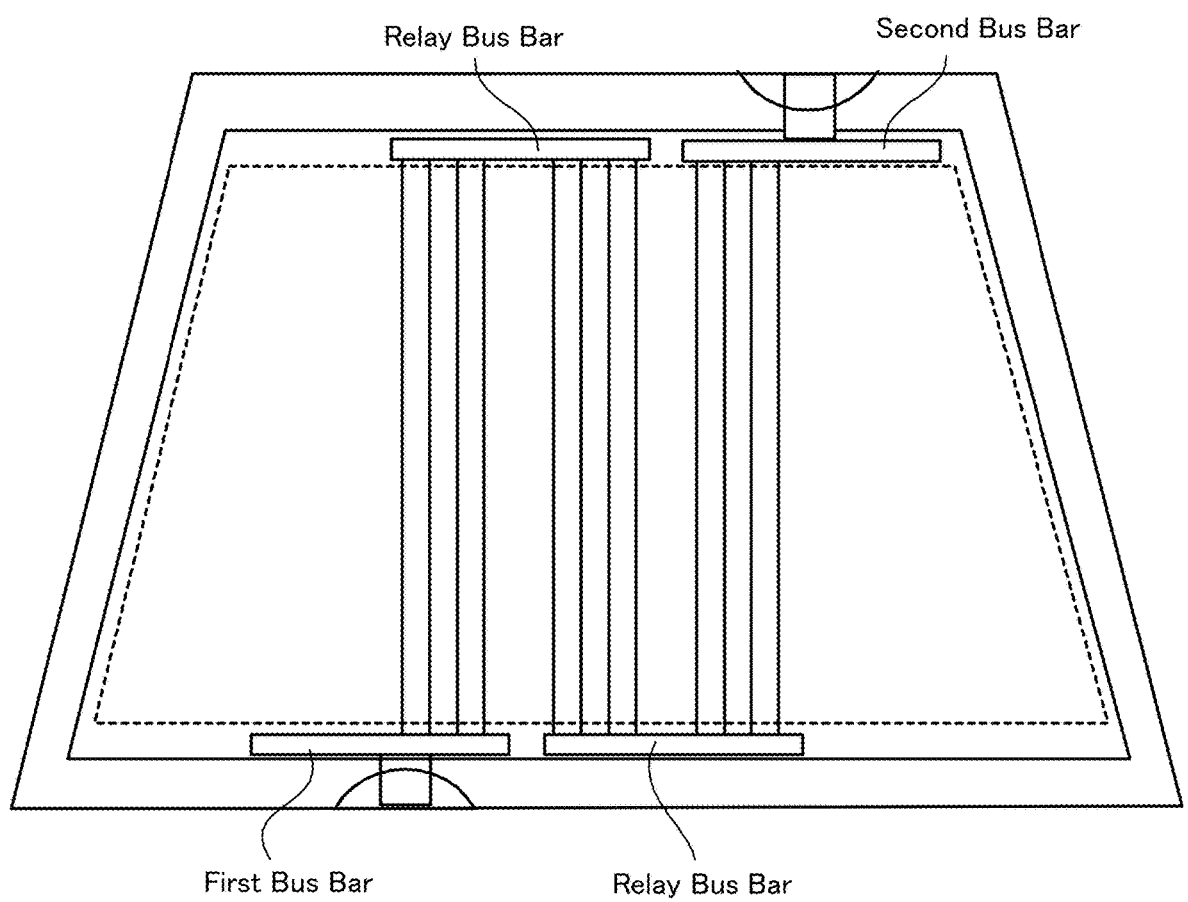
FIG. 27 is a plan view showing a schematic configuration of laminated glass in Examples 17 to 19 and Comparative Examples 5 to 7.

6. Examination of Relationship Between Heating Line Pitch and Flicker with Voltage of 48 V Next, an examination was conducted regarding the relationship between the heating line pitch and flicker when a voltage of 48 V is applied, using Examples 17 to 24 and Comparative Examples 5 to 8. Here, examples (Examples 20 to 24 and Comparative Example 8) in which the number of relay bus bars was three, similarly to FIG. 9, and examples (Examples 17 to 19 and Comparative Examples 5 to 7) in which the number of relay bus bars was two, as shown in FIG. 27, were prepared by simulation. In the example in FIG. 27, the second bus bar is arranged on the upper side since the number of relay bus bars is an even number. That is to say, the first bus bar and the second bus bar are arranged on opposing sides. Note that the numbers of heating lines in FIGS. 9 and 27 differ from the number of heating lines used in the simulation.

Conditions common to Examples 17 to 24 and Comparative Examples 5 to 8 are as follows.

TABLE 19

| Amount of heat generated (W/m$^2$) | 500 |
|---|---|
| Voltage (V) | 48 |
| Heat-generating region width (mm) | 1180 |
| Heat-generating region height (mm) | 958 |
| Heat-generating region area (m$^2$) | 1.13 |
| Power (W) | 565 |
| Total resistance (Ω) | 4.08 |
| Heating line thickness (μm) | 12 |
| Conductivity (Ω·m) | 1.80.E−08 |
| Crimp (%) | 120% |
| Length of 1 heating line (m) | 1.15 |

Examples 17 to 24 and Comparative Examples 5 to 8 were set as follows. Note that, although not all of the heating lines connected to each of the relay bus bars are completely the same, adjustments were made such that substantially the same number of heating lines is connected to each relay bus bar.

TABLE 20

|  | Example 17 | Example 18 | Example 19 | Example 20 | Example 21 | Example 22 | Example 23 | Example 24 |
|---|---|---|---|---|---|---|---|---|
| Number of relay bus bars | 2 | 2 | 2 | 3 | 3 | 3 | 3 | 3 |
| Heating line lower side width (μm) | 5.00 | 10.0 | 15.0 | 5.0 | 10.0 | 15.0 | 20.0 | 25.0 |
| Heating line upper side width (μm) | 3.0 | 8.0 | 13.0 | 3.0 | 8.0 | 13.0 | 18.0 | 23.0 |
| Heating line cross-sectional area (m$^2$) | 4.8E−11 | 1.08E−10 | 1.68E−10 | 4.8E−11 | 1.08E−10 | 1.68E−10 | 2.28E−10 | 2.88E−10 |
| Heating line resistance (Ω) | 431 | 192 | 123 | 431 | 192 | 123 | 91 | 72 |
| Number of heating lines (lines) | 317 | 141 | 91 | 423 | 188 | 121 | 89 | 71 |
| Heating line pitch (mm) | 1.2 | 2.8 | 4.3 | 0.7 | 1.6 | 2.4 | 3.3 | 4.2 |
| Heating line power (W) | 0.6 | 1.3 | 2.1 | 0.3 | 0.8 | 1.2 | 1.6 | 2.0 |
| Heating line amount of heat generated per length (W/m) | 0.5 | 1.2 | 1.8 | 0.3 | 0.7 | 1.0 | 1.4 | 1.7 |
| Flicker | OK | OK | OK | OK | OK | OK | OK | OK |

TABLE 21

|  | Comparative Example 5 | Comparative Example 6 | Comparative Example 7 | Comparative Example 8 |
|---|---|---|---|---|
| Number of relay bus bars | 2 | 2 | 2 | 3 |
| Heating line lower side width (μm) | 20.0 | 25.0 | 30.0 | 30.0 |
| Heating line upper side width (μm) | 18.0 | 23.0 | 28.0 | 28.0 |
| Heating line cross-sectional area (m$^2$) | 2.28E−10 | 2.88E−10 | 3.48E−10 | 3.48E−10 |
| Heating line resistance (Ω) | 91 | 72 | 59 | 59 |
| Number of heating lines (lines) | 67 | 53 | 44 | 58 |
| Heating line pitch (mm) | 5.9 | 7.4 | 9.0 | 5.1 |
| Heating line power (W) | 2.8 | 3.6 | 4.3 | 2.4 |
| Heating line amount of heat generated per length (W/m) | 2.5 | 3.1 | 3.7 | 2.1 |
| Flicker | NG | NG | NG | NG |

The evaluation criteria for flicker are the same as those when an examination with a voltage of 400 V was conducted. As shown in Table 21, the result of evaluating flicker was NG (no-good) in Examples 5 to 8 in which the amount of heat generated per length of each heating line exceeded 2.0 W/m.

Figure 28:
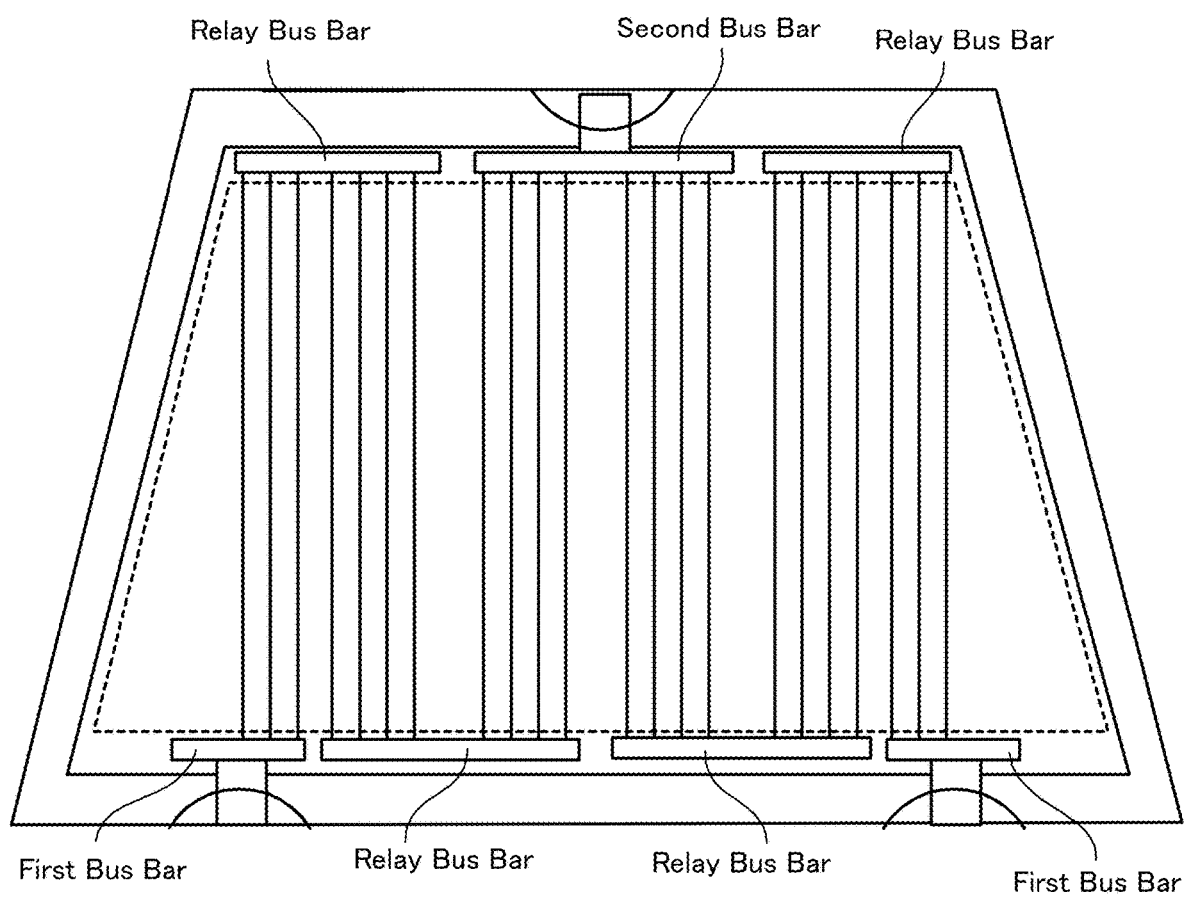
FIG. 28 is a plan view showing a modification of the laminated glass shown in FIG. 27.

Note that examples of laminated glass similar to the example in FIG. 27 may include laminated glass shown in FIG. 28. The laminated glass in FIG. 28 is obtained by combining two circuits of the laminated glass in FIG. 27 such that the second bus bar is shared thereby. In this example as well, the number of relay bus bars between the two bus bars (positive and negative electrodes) is two, and capabilities similar to those in the case of FIG. 27 are exhibited.

LIST OF REFERENCE NUMERALS

1 Outer glass plate
2 Inner glass plate
3 Intermediate layer
31 Heat-generating layer
311 Base material
312 First bus bar
313 Second bus bar
6 Heating line

The invention claimed is:

1. A laminated glass comprising:
   an outer glass plate having a first side and a second side opposing the first side;
   an inner glass plate that is arranged opposing the outer glass plate and has the same shape as the outer glass plate shape; and
   an intermediate layer arranged between the outer glass plate and the inner glass plate, wherein
   the intermediate layer has a heat-generating layer including:
      a first bus bar that at least partially extends along an end portion closer to the first side;
      a second bus bar that at least partially extends along an end portion closer to the second side; and
      a plurality of heating lines arranged so as to connect the first bus bar and the second bus bar to each other,
   the intermediate layer comprises a first adhesion layer and a second adhesion layer,
   sandwiching the heat-generating layer,
   the thickness of the second adhesion layer is 0.05 to 0.4 mm,
   the thickness of the first and second bus bar is 3 to 20 μm, and
   each of the heating lines has an amount of heat generated per unit length thereof of 2.0 W/m or less when a predetermined voltage is applied between the first and second bus bars.

2. The laminated glass according to claim 1, wherein the predetermined voltage is 400 V or less.

3. The laminated glass according to claim 1, wherein the amount of heat generated per unit length of each of the heating lines is 1.5 W/m or more and 2.0 W/m or less.

4. The laminated glass according to claim 1, wherein the heating lines are not in contact with any of the outer glass plate and the inner glass plate.

5. The laminated glass according to claim 1, wherein
   the largest value of an amount of heat generated per unit area of the intermediate layer when the voltage is applied is 400 W/m2 or more,
   the plurality of heating lines are arranged in parallel, and
   a distance between adjacent ones of the heating lines is 0.5 to 4.0 mm.

6. The laminated glass according to claim 1, wherein resistance of each of the heating lines is 30Ω or more.

7. The laminated glass according to claim 6, wherein a cross-sectional area of each of the heating lines is 200 μm$^2$ or less.

8. The laminated glass according to claim 7, wherein a line width of each of the heating lines is 22 μm or less.

9. The laminated glass according to claim 6, wherein a length of each of the heating lines between the two bus bars is greater than or equal to a distance between the first bus bar and the second bus bar.

10. The laminated glass according to claim 9, wherein at least one of the plurality of heating lines has, between the first bus bar and the second bus bar, at least one fold-back portion at which a direction in which the heating line extends is changed.

11. The laminated glass according to claim 9, further comprising:
- at least one relay bus bar arranged along an end portion closer to the first side or the second side, at a position different from the first bus bar and the second bus bar,
- wherein the plurality of heating lines are connected from the first bus bar via the at least one relay bus bar to the second bus bar.

12. The laminated glass according to claim 6, wherein
- at least some of the heating lines are formed to have a wave shape, and
- an actual length of the heating lines having the wave shape relative to a length between two ends of the heating lines on the heat-generating layer is 103% or more.

13. The laminated glass according to claim 6, wherein the heating lines are formed to have a sine wave shape, and an amplitude of the sine wave is 3 mm or more.

14. The laminated glass according to claim 6, wherein electric resistivity of the heating lines is $3 \times 10^{-8}$ $\Omega$m or less.

15. The laminated glass according to claim 14, wherein the heating lines are made of copper.

16. The laminated glass according to claim 1, wherein at least a portion of the first and second bus bars extends along a peripheral edge of the glass plates.

17. The laminated glass according to claim 16, wherein a width of each of the first and second bus bars is 10 mm or less.

* * * * *